United States Patent
Debow et al.

(10) Patent No.: US 12,132,210 B1
(45) Date of Patent: Oct. 29, 2024

(54) CATALYSTS FOR OXYGEN EVOLUTION REACTIONS

(71) Applicant: U.S. Army Combat Capabilities Development Command, Chemical Biological Center, APG, MD (US)

(72) Inventors: Shaun M Debow, Aberdeen Proving Ground, MD (US); Brendan G DeLacy, Havre de Grace, MD (US); Yi Rao, Logan, UT (US)

(73) Assignee: United States Army as Represented by the Secretary of the Army, Washington, DC (US)

( * ) Notice: Subject to any disclaimer, the term of this patent is extended or adjusted under 35 U.S.C. 154(b) by 227 days.

(21) Appl. No.: 17/480,346

(22) Filed: Sep. 21, 2021

Related U.S. Application Data

(60) Provisional application No. 63/082,194, filed on Sep. 23, 2020.

(51) Int. Cl.
| | |
|---|---|
| *H01M 4/90* | (2006.01) |
| *C25B 11/091* | (2021.01) |
| *H01M 4/86* | (2006.01) |
| *H01M 4/88* | (2006.01) |
| *H01M 12/06* | (2006.01) |
| *H01G 11/30* | (2013.01) |

(52) U.S. Cl.
CPC .............. *H01M 4/90* (2013.01); *C25B 11/091* (2021.01); *H01M 4/8657* (2013.01); *H01M 4/8825* (2013.01); *H01M 4/8853* (2013.01); *H01M 4/8882* (2013.01); *H01M 12/06* (2013.01); *H01G 11/30* (2013.01)

(58) Field of Classification Search
CPC . C25B 11/091; H01M 4/8657; H01M 4/8825; H01M 4/8853; H01M 4/8882; H01M 12/06; H01G 11/30
USPC .......................................................... 502/107
See application file for complete search history.

(56) References Cited

FOREIGN PATENT DOCUMENTS

| CN | 109701572 A | * | 5/2019 | |
| WO | WO-2019126031 A1 | * | 6/2019 | .............. B03D 3/06 |

OTHER PUBLICATIONS

Yu et al. "Boosting electrocatalytic oxygen evolution by synergistically coupling layered double hydroxide with MXene" Nano Energy 44 (2018), p. 181-190. (Year: 2018).*

(Continued)

*Primary Examiner* — Coris Fung
*Assistant Examiner* — Catriona M Corallo
(74) *Attorney, Agent, or Firm* — Timothy M. Barlow; Ulysses John Biffoni

(57) ABSTRACT

Techniques for preparing an electrocatalyst include growing and immobilizing an earth-abundant metal on an MXene two-dimensional (2D) substrate using a solvothermal, hydrothermal, or electrodeposition process. The earth-abundant metal may include NiFeOOH. The earth-abundant metal may include Mn, Fe, Co, Ni, Cu, Ti, V, Cr, and a combination thereof. The earth-abundant metal may be nanoparticles. The nanoparticles may include multiple metals. The electrocatalyst may be provided for an oxygen evolution reaction. The electrocatalyst may produce a current density of 500-1000 mA/cm$^2$ for at least 20 hours without degradation thereof.

7 Claims, 26 Drawing Sheets

(56) References Cited

OTHER PUBLICATIONS

Maleski et al. "Dispersions of Two-Dimensional Titanium Carbide MXene in Organic Solvents". Chemistry of Materials 29 (2017), p. 1632-1640. (Year: 2017).*

Dionigi et al. "NiFe-Based (Oxy)hydroxide Catalysts for Oxygen Evolution Reaction in Non-Acidic Electrolytes". Advanced Energy Materials 6 (2016), p. 1-20. (Year: 2016).*

Lu et al. "2D Layered Double Hydroxide Nanosheets and Their Derivatives Toward Efficient Oxygen Evolution Reaction". Nano-Micro Letters, Apr. 6, 2020, 12:86, p. 1-32. (Year: 2020).*

Zhang et al. "Extraction of nickel from NiFe-LDH into Ni2P@NiFe hydroxide as a bifunctional electrocatalyst for efficient overall water splitting". Chemical Science 9 (2018), p. 1375-1384. (Year: 2018).*

Patil et al. "Nanocrystalline copper-chromium-layered double hydroxide with tunable interlayer anions for electrochemical capacitor application". Synthetic Metals 264 (Apr. 13, 2020) 116371, p. 1-9. (Year: 2020).*

Cai et al. "Recent advances in layered double hydroxide electrocatalysts for the oxygen evolution reaction". J. Mater. Chem. A, (2019), 7, p. 5069-5089. (Year: 2019).*

Machine Translation of CN 109701572 A. (Year: 2019).*

Demazeau, Gerard. "Solvothermal Processes: Definition, Key Factors Governing the Involved Chemical Reactions and New Trends". Z. Naturforsch. 2010, 65b, p. 999-1006. (Year: 2010).*

Han et al. "Zn Doped FeCo Layered Double Hydroxide Nanoneedle Arrays with Partial Amorphous Phase for Efficient Oxygen Evolution Reaction". ACS Sustainable Chem. Eng. 2019, 7, p. 13105-13114. (Year: 2019).*

Zhao et al. "A one-step synthesis of hierarchical porous CoFe-layered double hydroxide nanosheets with optimized composition for enhanced oxygen evolution electrocatalysis". Inorg. Chem. Front., 2020 (Accepted Nov. 24, 2019), 7, p. 737-745. (Year: 2020).*

Garg et al. "Synthesis and optimisation of MXene for supercapacitor application". J Mater Sci: Mater Electron, Sep. 22, 2020, 31: 18614-18626. (Year: 2020).*

Kim et al. "Topology dependent modification of layered double hydroxide for therapeutic and diagnostic platform". Advanced Drug Delivery Reviews 188 (2022) 14459. (Year: 2022).*

* cited by examiner

D → Mixing the first solution with the second solution to form the combined solution — 145

E → Adding metal or halogen dopants or contaminants in the earth-abundant metal — 170

F → Altering a surface roughness or porosity of the earth-abundant material — 175

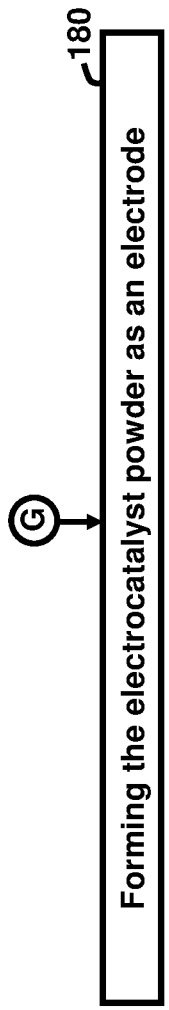

Forming the electrocatalyst powder as an electrode — 180

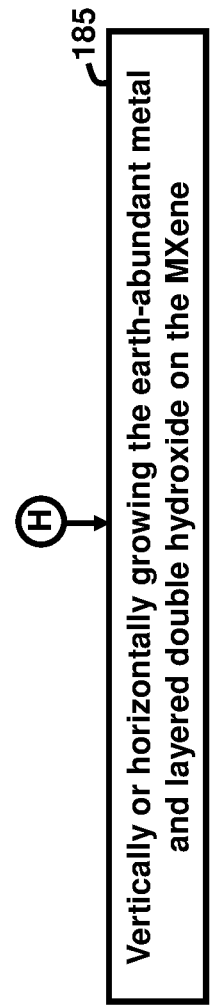

Vertically or horizontally growing the earth-abundant metal and layered double hydroxide on the MXene — 185

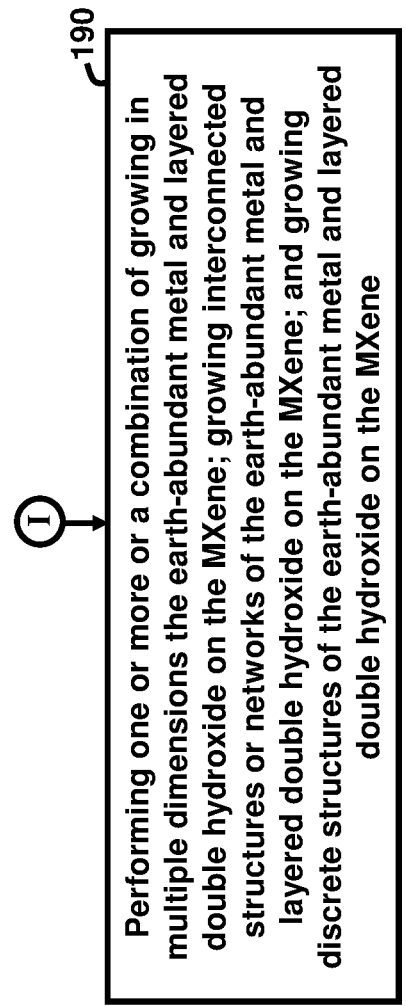

Performing one or more or a combination of growing in multiple dimensions the earth-abundant metal and layered double hydroxide on the MXene; growing interconnected structures or networks of the earth-abundant metal and layered double hydroxide on the MXene; and growing discrete structures of the earth-abundant metal and layered double hydroxide on the MXene — 190

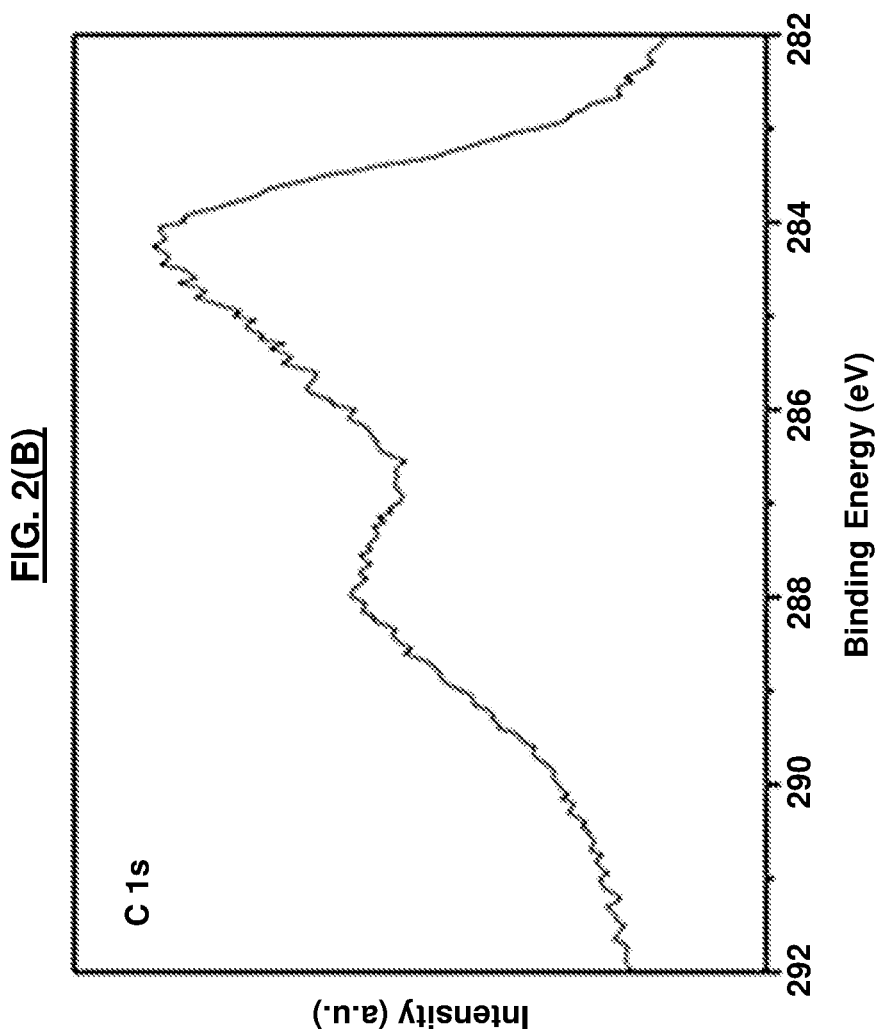

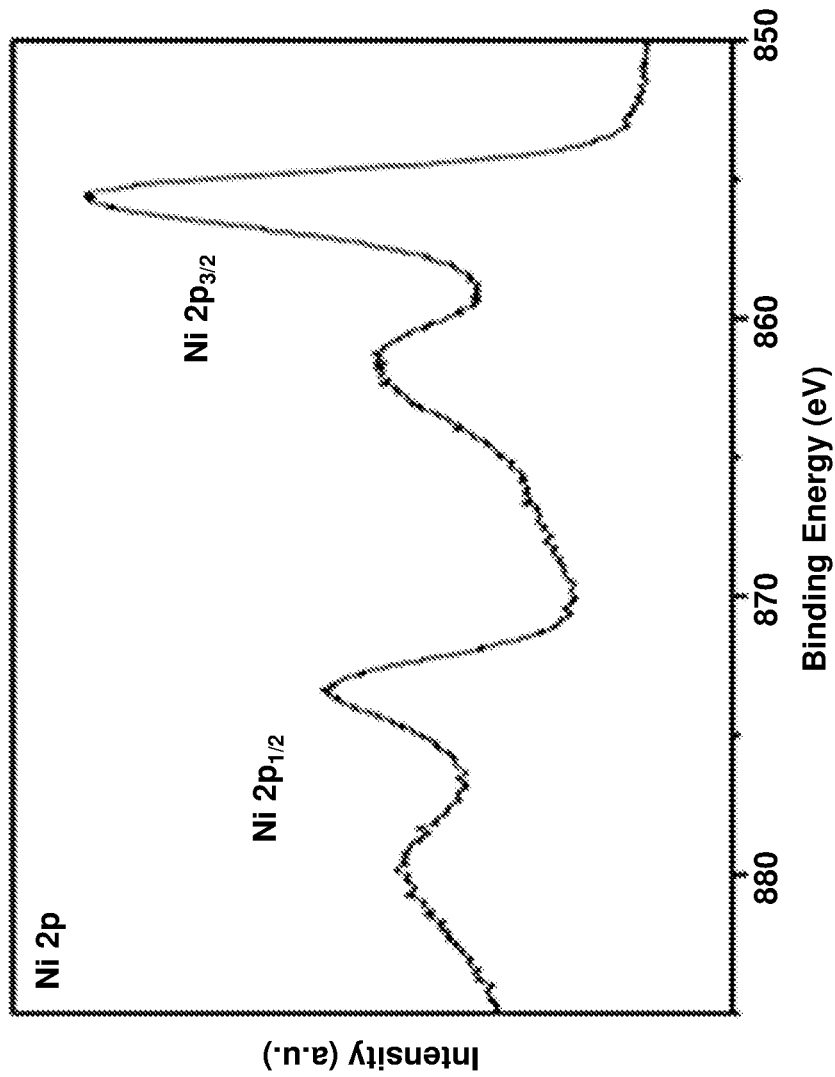

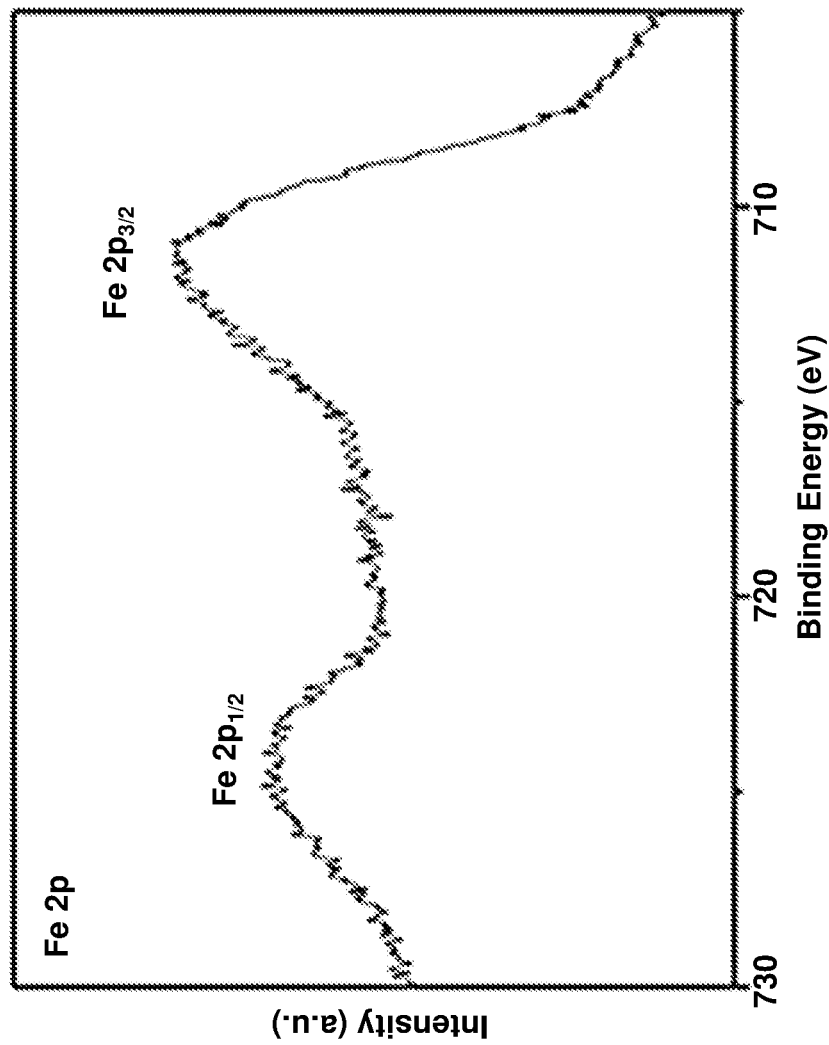

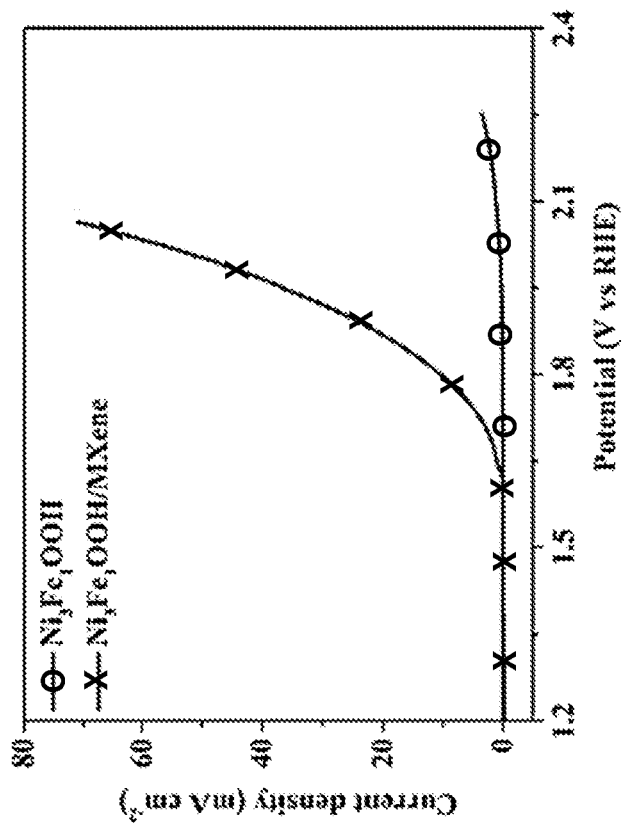
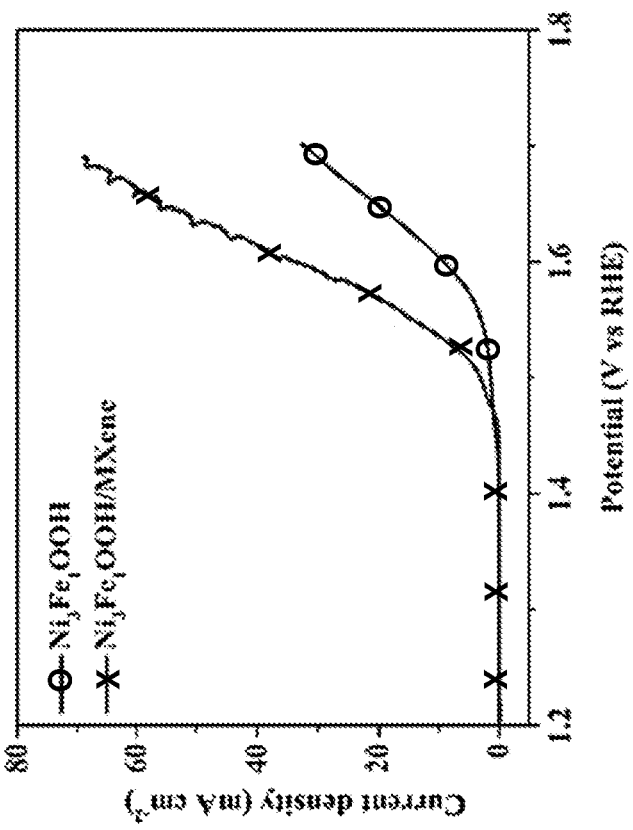
FIG. 5(A)
FIG. 5(B)

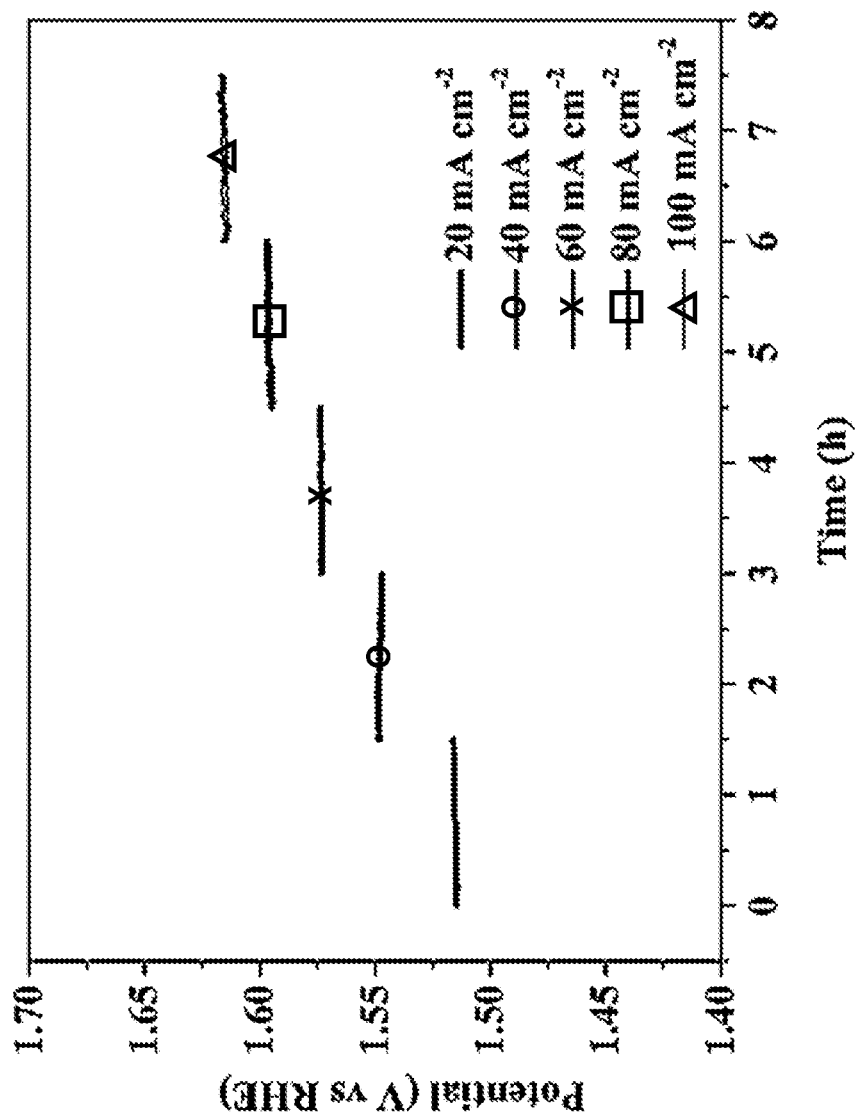

CATALYSTS FOR OXYGEN EVOLUTION REACTIONS

CROSS REFERENCE TO RELATED APPLICATION

This application claims the benefit of U.S. Provisional Patent Application No. 63/082,194 filed on Sep. 23, 2020, the contents of which, in its entirety, is herein incorporated by reference.

GOVERNMENT INTEREST

The embodiments herein may be manufactured, used, and/or licensed by or for the United States Government.

BACKGROUND

Technical Field

The embodiments herein generally relate to energy conversion technologies, and more particularly to electrocatalysts used in energy storage devices.

DESCRIPTION OF THE RELATED ART

Electrocatalytic oxygen evolution reactions (OER) have been considered as a core reaction in renewable energy conversion and storage devices, such as water electrolyzer and metal-air batteries. However, OER tends to suffer from sluggish kinetics, due to the complex multi-electron transfers during the whole process ($4OH^+4e \rightarrow 2H_2O+O_2$). Improving the process will require development of high-efficiency electrocatalysts, and these catalysts may act to lower the activation energies required to break apart O—H bonds and form O=O double bonds. Moreover, this will be critically important to accelerate the oxygen evolution reaction. Up to now, NiFe-based layered double hydroxides (NiFe-LDHs) are regarded as a promising non-noble OER catalyst due to their earth abundance, high catalytic activity, and good stability. The $Fe^{3+}$ dopant can increase the conductivity and accelerated charge transfer from Fe sites to Ni active centers, thereby improving catalytic performance. In addition, $Fe^{3+}$ in $Ni_xFe_{1-x}OOH$ occupies octahedral sites and shortens the metal-O bond distances, optimizes the adsorption energy of OER intermediates, and results in a low overpotential for oxygen evolution. However, their performance is still far from being an industrially viable material due to intrinsically poor conductivity, low active catalytic site availability and a strong tendency to aggregate. Therefore, developing noble-metal free NiFe-LDH-based electrocatalysts with excellent OER performance is of vital importance, but is quite challenging.

The active sites of most transition-metal-based two-dimensional (2D) materials are mainly located at the edge sites. Hence, activating these edge sites is vital to further enhance the catalytic activity of 2D electrocatalysts. Additionally, these exposed metallic centers can be used as coordinative sites that not only decrease the energy barrier of subsequent electrochemical reactions, but also enhance the capture ability of electrolyte ions, resulting in an improvement of electrochemical reaction kinetics. Recently, considerable efforts have been focused on immobilization of earth-abundant 2D catalysts onto conductive substrates to significantly improve catalytic performance. These results show that solid supports can efficiently stabilize the 2D electrocatalyst structure, resulting in increased performance through highly exposed surfaces, improved conductivity enabling fast charge transfer. This highlights the effect of solid supports on improving catalytic activities of 2D electrocatalysts.

MXene ($Ti_3C_2T_x$), the novel family of transition metal carbides/nitrides/carbonitrides having the general formula of $M_{n+1}X_nT_x$, (M represents an early transition metal and is C and/or N, and T stands for the functional groups such as —OH, —O, —Cl, and —F), has attracted significant research interest in energy-related applications, particularly in super-capacitors and batteries. MXenes are particularly well-suited for these applications due their highly hydrophilic surfaces and high electron conductivity. MXene is regarded as a promising candidate to support metallic electrocatalysts. Rare-earth and precious metals have been used for OER applications, but wide-spread use is limited by their limited availability and high cost.

SUMMARY

In view of the foregoing, an embodiment herein provides a method of preparing an electrocatalyst, the method comprising growing and immobilizing an earth-abundant metal on a MXene two-dimensional (2D) substrate using a solvothermal, hydrothermal, or electrodeposition process. The earth-abundant metal may comprise NiFeOOH. The earth-abundant metal may comprise Mn, Fe, Co, Ni, Cu, Ti, V, Cr, and a combination thereof. The method may comprise performing post-synthesis processes such as ion exchange and intercalation with metal ions (such as, Co2+, V5+, Cr3+) to replace at least one existing metal site (such as, Fe) to promote an oxygen evolution reaction (OER). The earth-abundant metal may comprise nanoparticles. The nanoparticles may comprise multiple metals. The method may comprise providing the electrocatalyst for an oxygen evolution reaction. The electrocatalyst may produce a current density of 500-1000 $mA/cm^2$ for at least 20 hours without degradation thereof. The method may comprise creating defects (i.e., using techniques such as selective etching) in a layered double hydroxide (LDH) crystalline structure of the MXene to increase a number of reactive sites available for catalysis.

Another embodiment provides a method of preparing an electrocatalyst for oxygen evolution reactions, the method comprising synthesizing MXene; synthesizing an earth-abundant metal and a layered double hydroxide; mixing the MXene and the earth-abundant metal and layered double hydroxide to form a combined solution; performing a solvothermal, hydrothermal, or electrodeposition process on the combined solution; centrifuging the mixed solution to separate solids from liquids in the combined solution; and drying the solids to form an electrocatalyst powder. Synthesizing the MXene may comprise etching a $Ti_3AlC_2$ MAX phase in a mixture of HCl and LiF to produce $Ti_3C_2$; washing the $Ti_3C_2$; and drying the $Ti_3C_2$ under vacuum. The method may comprise ultrasonically dispersing the MXene in dimethylformamide to form a first solution.

Synthesizing the earth-abundant metal and layered double hydroxide may comprise dissolving $Ni(NO_3)_2 \cdot 6H_2O$, $Fe(NO_3)_3 \cdot 9H_2O$ or $Co(NO_3)_2 \cdot 6H_2O$, $Fe(NO_3)_3 \cdot 9H_2O$, and urea in deionized water and dimethylformamide to form a second solution. The method may comprise mixing the first solution with the second solution to form the combined solution. The method may comprise adding metal or halogen dopants or contaminants in the earth-abundant metal. The method may comprise altering a surface roughness or porosity of the earth-abundant material. The method may comprise forming the electrocatalyst powder as an electrode. The method may comprise vertically or horizontally growing the earth-abundant metal and layered double hydroxide on the MXene. The method may comprise performing one or more or a combination of growing in multiple dimensions the earth-abundant metal and layered double hydroxide on the MXene; growing interconnected structures or networks of the earth-abundant metal and layered double hydroxide on the MXene; and growing discrete structures of the earth-abundant metal and layered double hydroxide on the MXene.

Another embodiment provides an electrocatalyst for an oxygen evolution reaction formed by growing and immobilizing an earth-abundant metal and layered double hydroxide on a MXene two-dimensional (2D) substrate. The electrocatalyst may produce a current density of 500-1000 mA/cm$^2$ for at least 20 hours without degradation thereof. The earth-abundant metal may comprise any of NiFeOOH, Mn, Fe, Co, Ni, Cu, Ti, V, Cr, and a combination thereof. The MXene 2D substrate may comprise Ti sites that are used as donors to stabilize the earth-abundant metal and layered double hydroxide to alter electrocatalytic oxygen evolution reactions of the electrocatalyst. The MXene may comprise a composition according to the formula $M_{n+1}X_nT_x$, where M is an early transition metal, X is C and/or N, T represents functional groups comprising one or more of the group consisting of —OH, —O, —Cl, and —F, n is an integer with n≥1, and x is an integer with x≥1. The MXene 2D substrate may comprises MXene in the form of sheets having surfaces functionalized with functional groups comprising one or more of the group consisting of —OH, —O, —Cl, and —F.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1(H) is a flow diagram illustrating a method of utilizing an electrocatalyst powder, according to an embodiment herein;

FIG. 1(I) is a flow diagram illustrating a method of growing an earth-abundant metal and layered double hydroxide, according to an embodiment herein;

FIG. 1(J) is a flow diagram illustrating methods of preparing an electrocatalyst, according to some embodiments herein;

FIG. 2(B) is an X-ray photoelectron spectroscopy (XPS) spectrum of C for NiFe-LDH/$Ti_3C_2T_x$, according to an embodiment herein;

FIG. 2(E) is an XPS spectrum of Ni for NiFe-LDH/$Ti_3C_2T_x$, according to an embodiment herein;

FIG. 2(F) is an XPS spectrum of Fe for NiFe-LDH/$Ti_3C_2T_x$, according to an embodiment herein;

FIG. 5(A) are LSV curves of $Ni_3Fe_1$-LDH/MXene and $Ni_3Fe_1$-LDH in $O_2$-saturated 0.1 M KOH, according to an embodiment herein;

FIG. 5(B) are LSV curves of $Ni_3Fe_1$-LDH/MXene and $Ni_3Fe_1$-LDH in $O_2$-saturated 0.1 M KPi (Potassium Phosphate), according to an embodiment herein;

FIG. 6(B) are multi-step chronopotentiometry curves of $Ni_3Fe_1$-LDH/MXene with the different current densities from 20 to 100 mA cm$^{-2}$ for 1.5 h in $O_2$-saturated 1.0 M KOH, according to an embodiment herein;

DETAILED DESCRIPTION

Figure 1A:
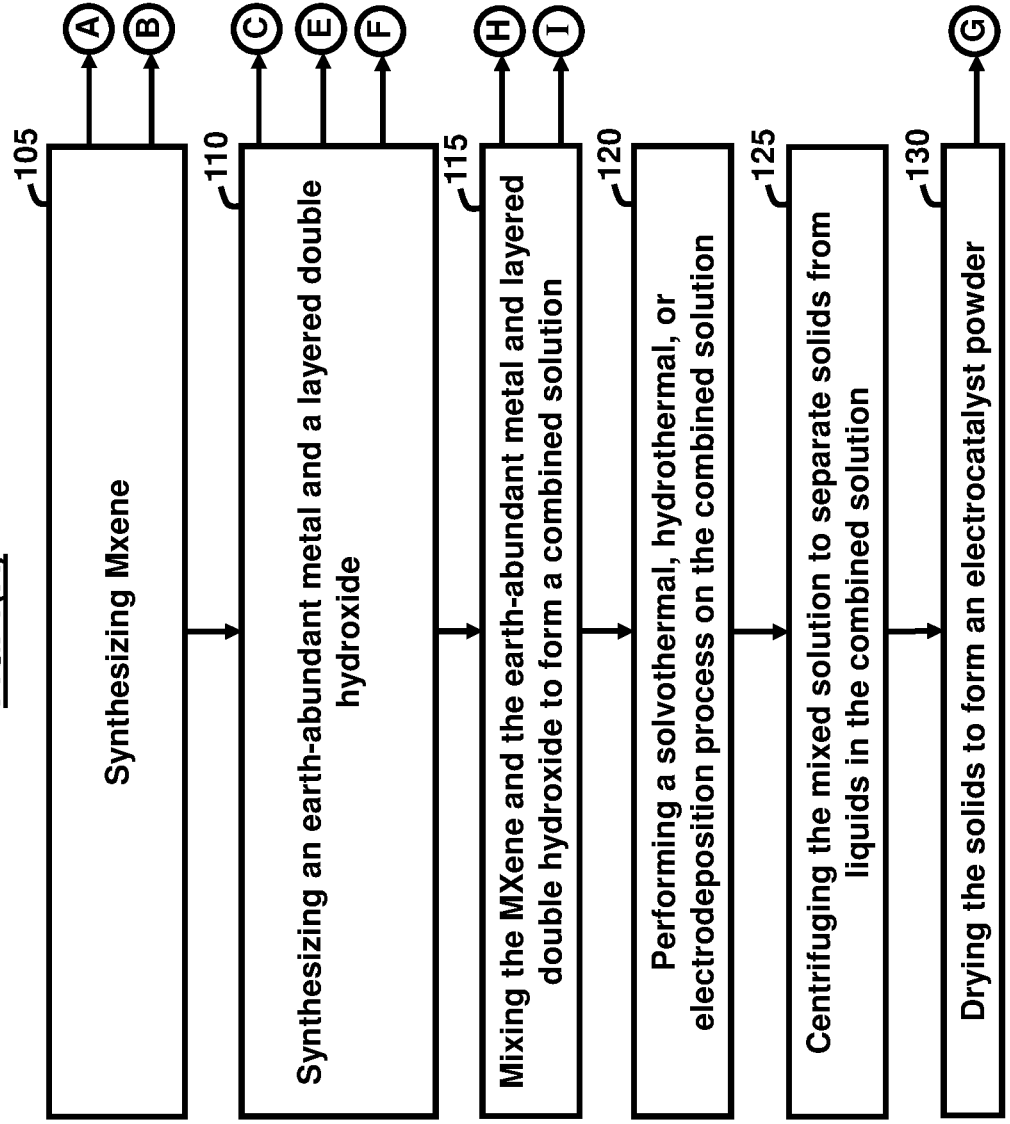
FIG. 1(A) is a flow diagram illustrating a method of preparing an electrocatalyst for oxygen evolution reactions, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a superior technology for OER. Rare-earth and precious metals may be used for OER applications. Two such metals belong to the platinum group of metals, those being Pt (the best performing) and Ru. However, other metals are also applicable such as Co either as constituents or dopants. The embodiments herein utilize earth-abundant metals immobilized on the surface of MXene sheets for catalytic OER. Recently, by virtue of rich functional groups on the MXene surface, NiCoP has been immobilized on MXene nanosheets through an in-situ interface-growth strategy combined with subsequent phosphorization. The resultant NiCoP is vertically grown on a planar MXene surface, exposing more catalytic sites. Such a structure can efficiently accelerate charge transfer and enhance synergistic effect between NiCoP on MXene, resulting in improvement of catalytic performance. Earth abundant metals had not previously been considered viable due to their sluggish kinetics and difficulty driving the proton-coupled charge transfer process. Further, transition-metal-based double hydroxides have been poor conductors, possess limited surface area that is electrochemically active and have a strong tendency to aggregate. According to the embodiments herein, NiFeOOH particles are grown and immobilized on the MXene surface through a solvothermal, hydrothermal, or electrodeposition process. The MXene-NiFeOOH is then used to create a working electrode that is a superior OER catalyst compared to conventional electrocatalysts. Nanoparticles comprising multiple metals (and not just single or bi-meal compositions) are grown on MXene sheets and generally have smaller diameters and hence higher surface areas. Accordingly, the small particles are believed to contribute to the low charge transfer resistance in basic solution. The embodiments herein provide robust OER catalytic properties by maintaining a stable potential input to produce a high current density of 500 to 1000 mA/cm$^2$ for over 20 hours, and no degradation in a 0.1 M basic solution, which is a significant advance in the energy conversion and storage industry. Referring now to the drawings, and more particularly to FIGS. 1(A) through 8, where similar reference characters denote corresponding features consistently throughout the figures, there are shown preferred embodiments. In the drawings, the size and relative sizes of components, layers, and regions, etc. may be exaggerated for clarity.

Figure 1B:
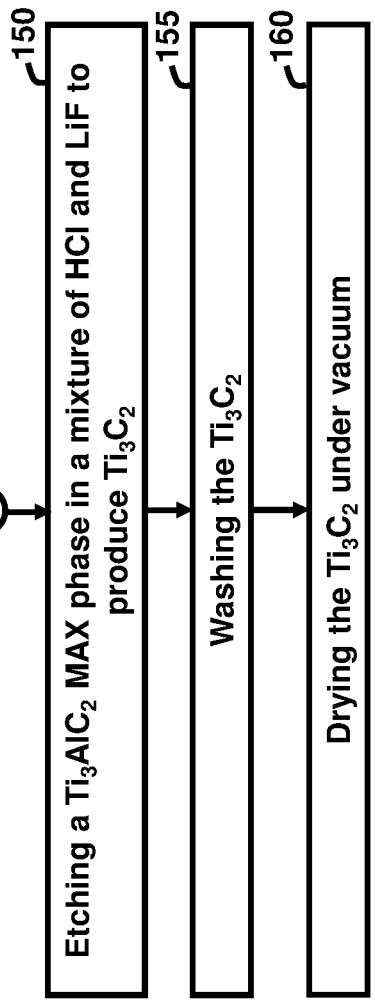
FIG. 1(B) is a flow diagram illustrating a method of synthesizing MXene, according to an embodiment herein.
Figure 1C:
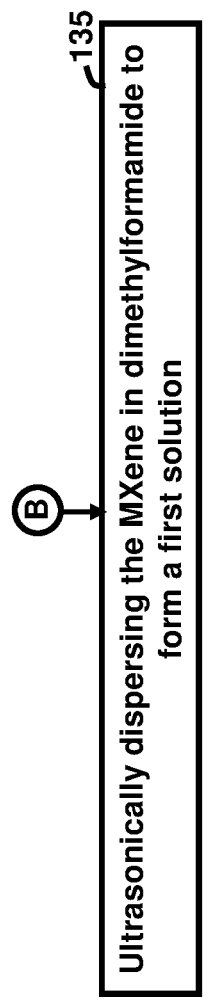
FIG. 1(C) is a flow diagram illustrating a method of forming a first solution, according to an embodiment herein.

FIGS. 1(A)-1(J) are flow diagrams illustrating a method 100 for preparing an electrocatalyst for oxygen evolution reactions. As shown in FIG. 1(A), the method 100 comprises synthesizing (105) MXene; synthesizing (110) an earth-abundant metal and a layered double hydroxide; mixing (115) the MXene and the earth-abundant metal and layered double hydroxide to form a combined solution; performing (120) a solvothermal, hydrothermal, or electrodeposition process on the combined solution; centrifuging (125) the mixed solution to separate solids from liquids in the combined solution; and drying (130) the solids to form an electrocatalyst powder. MXene comprises a composition according to the formula Mn+1XnT$_x$, where M is an early transition metal, X is C and/or N, T represents functional groups comprising one or more of the group consisting of —OH, —O, —Cl, and —F, n is an integer with n≥1, and x is an integer with x≥1. In an example, FIG. 1(B) provides that synthesizing (105) the MXene may comprise etching (150) a $Ti_3AlC_2$ MAX phase in a mixture of HCl and LiF to produce $Ti_3C_2$; washing (155) the $Ti_3C_2$; and drying (160) the $Ti_3C_2$ under vacuum. As provided in FIG. 1(C), the method 100 may comprise ultrasonically dispersing (135) the MXene in dimethylformamide to form a first solution.

Figure 1D:
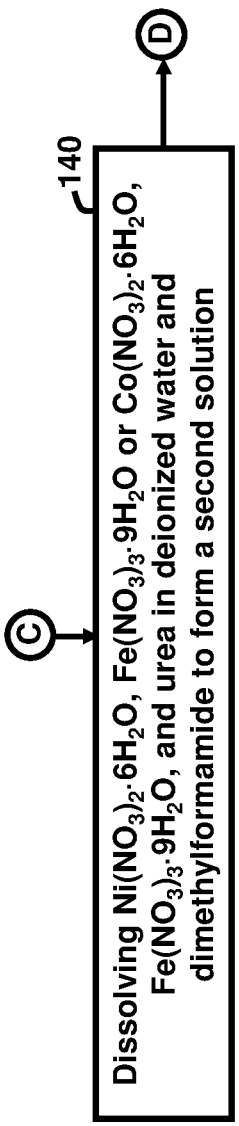
FIG. 1(D) is a flow diagram illustrating a method of synthesizing an earth-abundant metal and a layered double hydroxide, according to an embodiment herein.
Figure 1E:
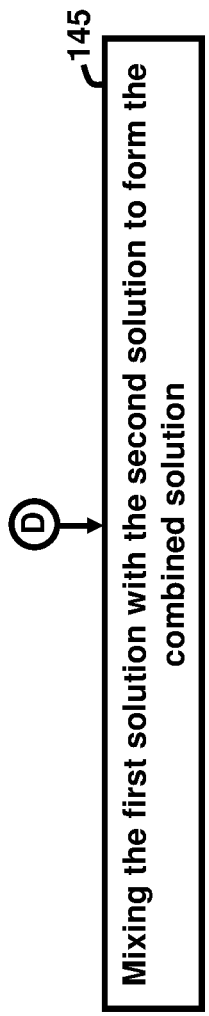
FIG. 1(E) is a flow diagram illustrating a method of forming a combined solution, according to an embodiment herein.
Figure 1F:
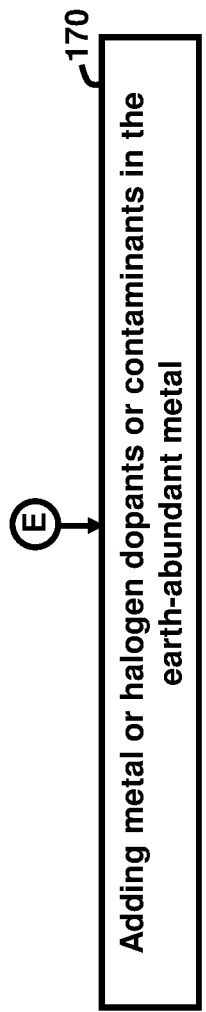
FIG. 1(F) is a flow diagram illustrating a method of altering material properties of the earth-abundant material, according to an embodiment herein.
Figure 1G:
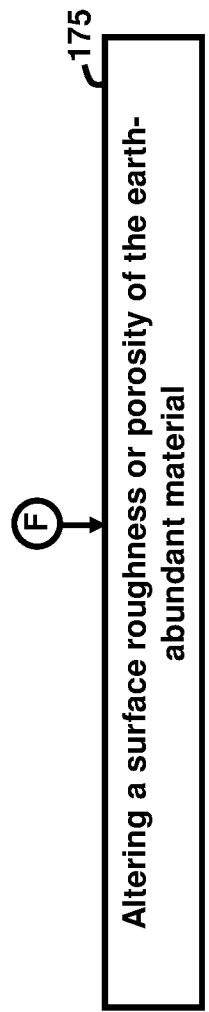
FIG. 1(G) is a flow diagram illustrating another method of altering material properties of the earth-abundant material, according to an embodiment herein.

FIG. 1(D) provides that synthesizing (110) the earth-abundant metal and layered double hydroxide may comprise dissolving (140) $Ni(NO_3)_2 \cdot 6H_2O$, $Fe(NO_3)_3 \cdot 9H_2O$ or $Co(NO_3)_2 \cdot 6H_2O$, $Fe(NO_3)_3$: $9H_2O$, and urea in deionized water and dimethylformamide to form a second solution. As provided in FIG. 1(E), the method 100 may comprise mixing (145) the first solution with the second solution to form the combined solution. As provided in FIG. 1(F), the method 100 may comprise adding (170) metal or halogen dopants or contaminants in the earth-abundant metal. As provided in FIG. 1(G), the method 100 may comprise altering (175) a surface roughness or porosity of the earth-abundant material. As provided in FIG. 1(H), the method 100 may comprise forming (180) the electrocatalyst powder as an electrode.

The earth-abundant metal and layered double hydroxide may form both single and interconnected structures having multiple dimensions on the MXene surface. In this regard, the earth-abundant metal and layered double hydroxide formation is not limited to only vertical or horizontal growth. As provided in FIG. 1(I), the method 100 may comprise vertically or horizontally growing (185) the earth-abundant metal and layered double hydroxide on the MXene. As provided in FIG. 1(J), the method 100 may comprise performing (190) one or more or a combination of growing in multiple dimensions the earth-abundant metal and layered double hydroxide on the MXene; growing interconnected structures or networks of the earth-abundant metal and layered double hydroxide on the MXene; and growing discrete structures of the earth-abundant metal and layered double hydroxide on the MXene.

In order to confirm the validity of the techniques provided by the embodiments herein, experiments were performed. The specific parameters, values, amounts, ranges, materials, types, brands, etc. described below are approximates and were merely selected for the experiments, and as such the embodiments herein are not limited to the specific descriptions below.

Figure 2A:
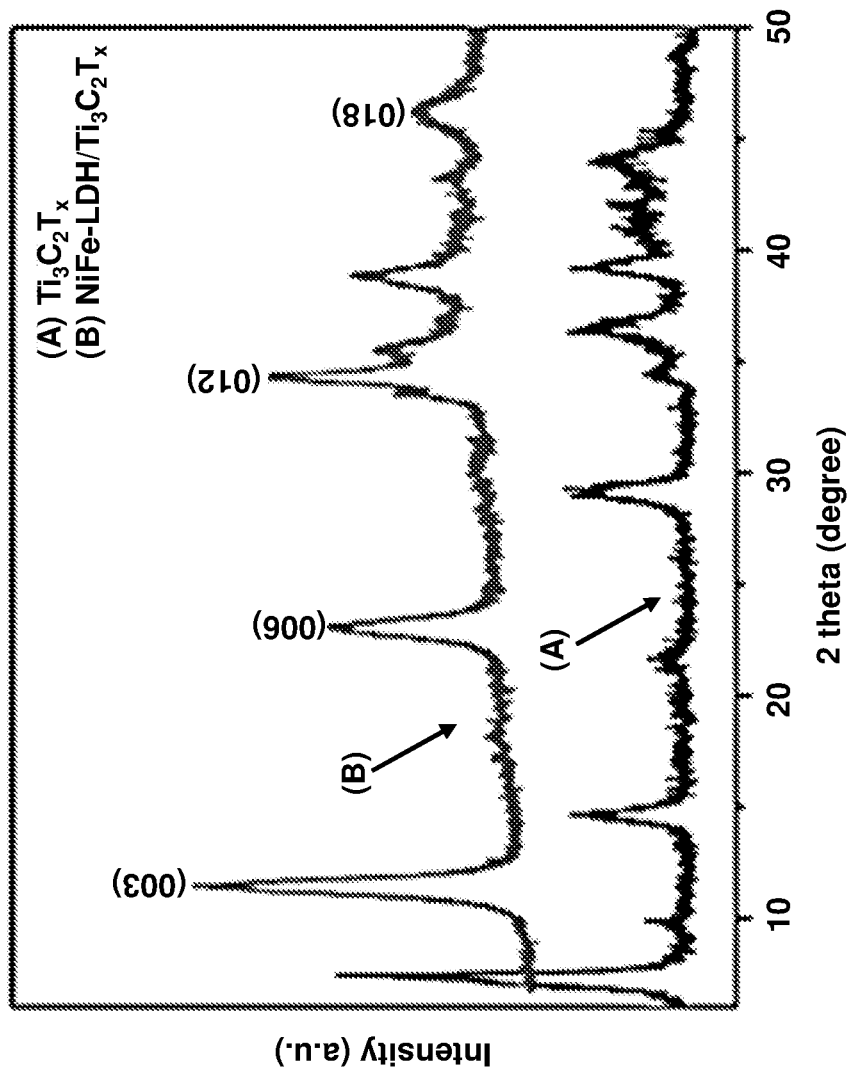
FIG. 2(A) are X-ray diffraction (XRD) patterns of $Ti_3C_2T_x$ and NiFe-LDH/$Ti_3C_2T_x$, according to an embodiment herein.
Figure 2C:
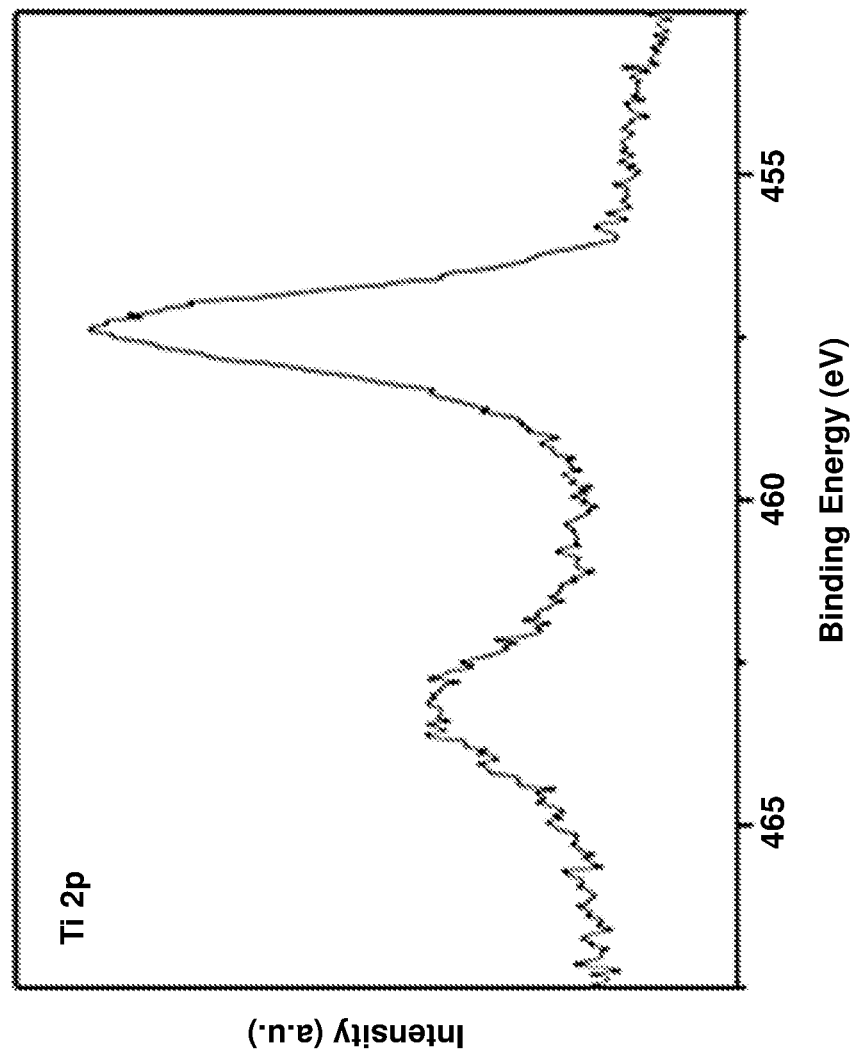
FIG. 2(C) is an XPS spectrum of Ti for NiFe-LDH/$Ti_3C_2T_x$, according to an embodiment herein.
Figure 2D:
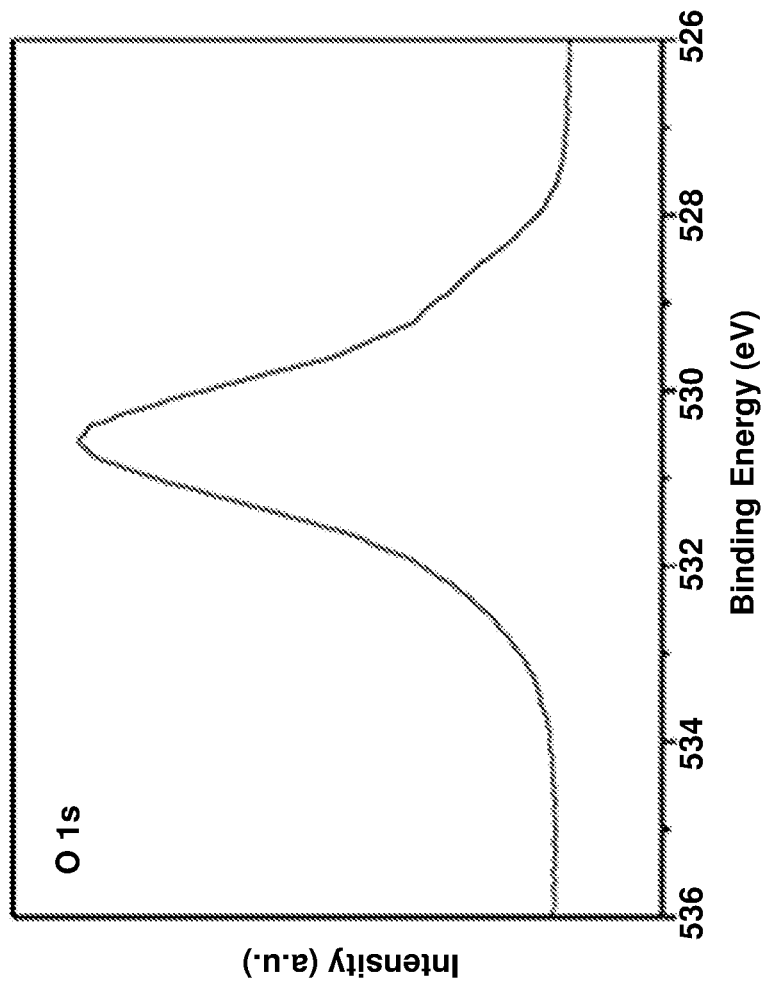
FIG. 2(D) is an XPS spectrum of O for NiFe-LDH/$Ti_3C_2T_x$, according to an embodiment herein.

In an example, the structure characteristics of $Ti_3C_2T_x$ and NiFe-LDH/$Ti_3C_2T_x$ may be investigated by XRD, as shown in FIG. 2(A). The peak (001) of $Ti_3C_2$ is broadened and negatively shifted, indicating that Al layers have been selectively etched and the interlayer distances have enlarged. After growing supported metallic NiFe-LDH on the surface of $Ti_3C_2$, the peaks appear around 11.37°, 23.32°, 34.25°, 37.95°, and 55.65°, which can be indexed to the (003), (006), (012), (015), and (018) planes, respectively. The disappearance of the peak for the (001) plane from $Ti_3C_2$ MXene suggests the suppressed restacking of MXene sheets by FeNi-LDH nanostructure standing on its surface. XPS is further used to characterize the valence state and chemical composition of the as-prepared NiFe-LDH/$Ti_3C_2T_x$. As shown in FIG. 2(B), the high-resolution XPS spectrum of C Is demonstrates three peaks of C—C (284.6 eV) and O—C—O bonds (288.5 eV). The high-resolution spectrum of Ti 2p can be fitted with two peaks of 457.5, and 463.1 eV, which were attributed to Ti $2p_{3/2}$ and Ti $2p_{1/2}$, respectively as shown in FIG. 2(C). For O Is core level, the peak was observed at 530.2 eV, and assigned to O Is as shown in FIG. 2(D). Moreover, the Ni 2p region were plotted in FIG. 2(E) with two main peaks at 855.7 and 873.5 eV, attributed to Ni $2p_{3/2}$ and $2p_{1/2}$ core levels, respectively. Their corresponding satellite peaks are located at 861.9 and 879.5 eV. For the high-resolution core-level spectrum of Fe 2p, the binding energies of Fe $3p_{3/2}$ and Fe $3p_{1/2}$ were observed at 711.3 and 724.5 eV, respectively as shown in FIG. 2(F). The above XRD and XPS results clearly confirm that NiMoCo/MXene has been successfully formed in accordance with the method (100) described above.

Figure 3C:
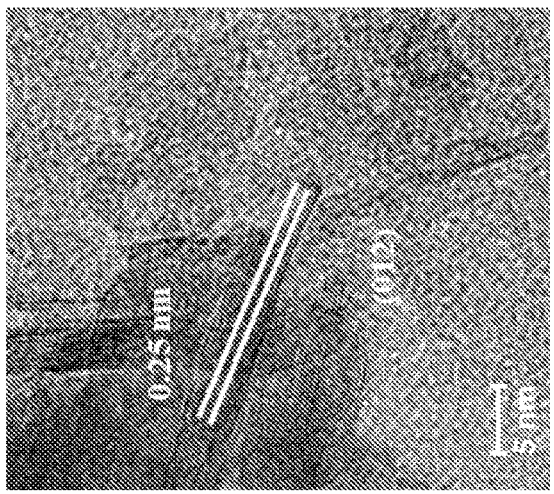
FIG. 3(C) is a transmission electron microscopy (TEM) image of NiFe-LDH/$Ti_3C_2T_x$ with a scale bar of 5 nm, according to an embodiment herein.
Figure 3A:
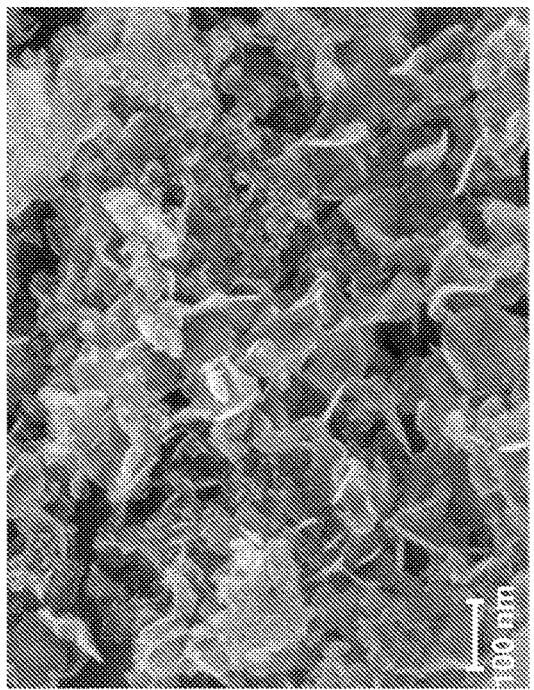
FIG. 3(A) is a scanning electron microscopy (SEM) image of NiFe-LDH/$Ti_3C_2T_x$ with a scale bar of 100 nm, according to an embodiment herein.
Figure 3B:
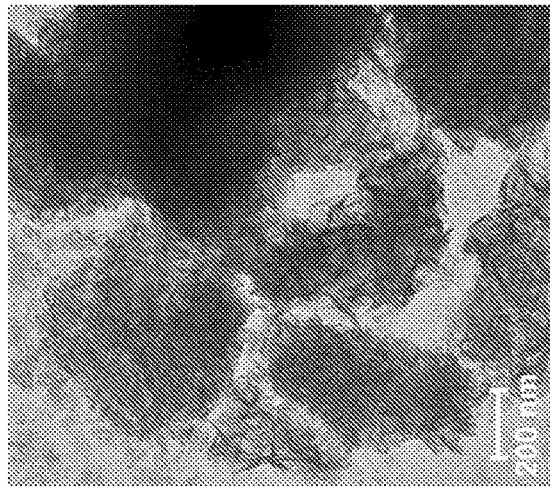
FIG. 3(B) is a transmission electron microscopy (TEM) image of NiFe-LDH/$Ti_3C_2T_x$ with a scale bar of 200 nm, according to an embodiment herein.
Figure 3D:
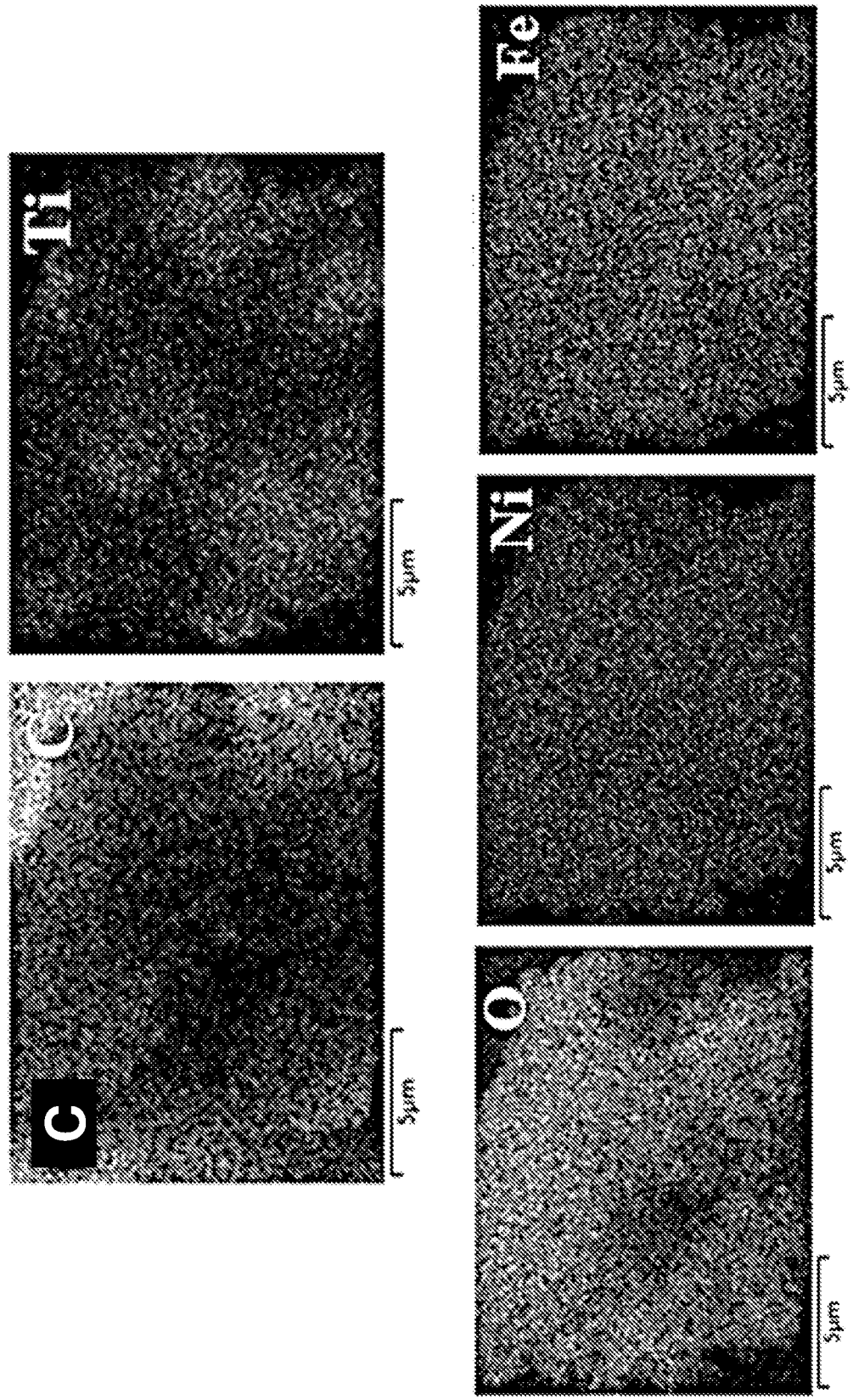
FIG. 3(D) are elemental mapping images of NiFe-LDH/$Ti_3C_2T_x$ with a scale bar of 5 μm, according to an embodiment herein.

The morphology of the as-prepared NiFe-LDH/$Ti_3C_2T_x$ was further characterized by SEM. The formation of 3D interconnected porous networks of FeNi-LDH nanoplates standing on MXene sheets is clearly visible in FIG. 3(A). TEM examination further indicates the growth of loosely packed networks of NiFe-LDH nanoplates with very thin thickness of several nanometers on the MXene surface as shown in FIGS. 3(B)-3(C). High-resolution TEM (HRTEM) observation indicates the single crystalline nature of NiFe-LDH nanoplates by clear lattice fringes of 0.25 nm that corresponds to the (012) plane of the NiFe-LDH crystal. In addition, the elemental mapping images indicate a homogeneous distribution of Ti, C, O, Ni, and Fe as shown in FIG. 3(D). The molar ratio of Ni/Fe is about 2.9:1, which agrees with the EDX result. Therefore, these structural and morphological analyses indicate that the NiFe-LDH were monodispersed on MXene surfaces. This novel nanocomposite is highly favorable to mass diffusion and charge transfer in the OER reaction process.

Figure 4B:
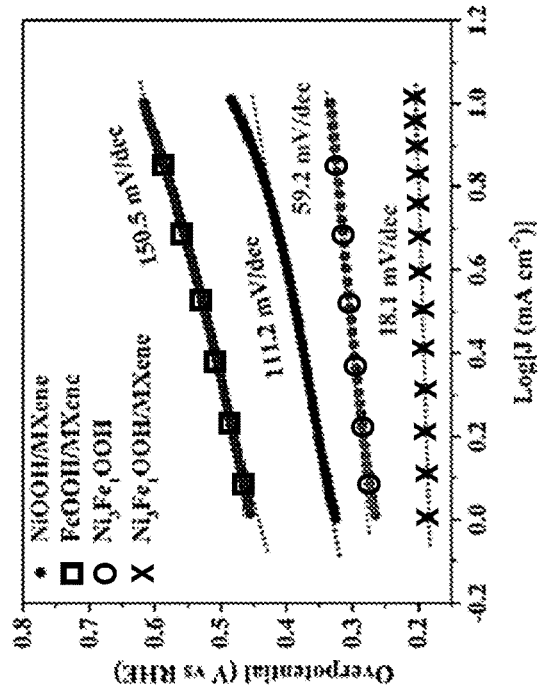
FIG. 4(B) are Tafel plots of $Ni_3Fe_1$-LDH/MXene, Ni-LDH/MXene, Fe-LDH/MXene, and $Ni_3Fe_1$-LDH in $O_2$-saturated 1.0 M KOH, according to an embodiment herein.
Figure 4D:
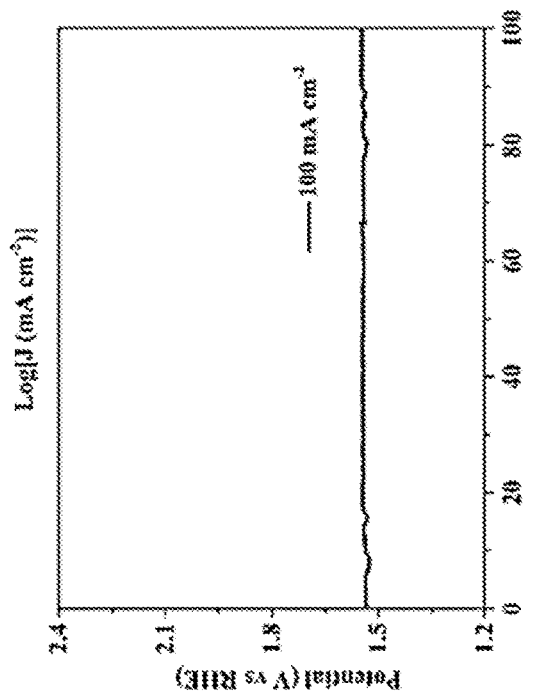
FIG. 4(D) is a chronopotential plot of $Ni_3Fe_1$-LDH/MXene in 1.0 M KOH, according to an embodiment herein.
Figure 4A:
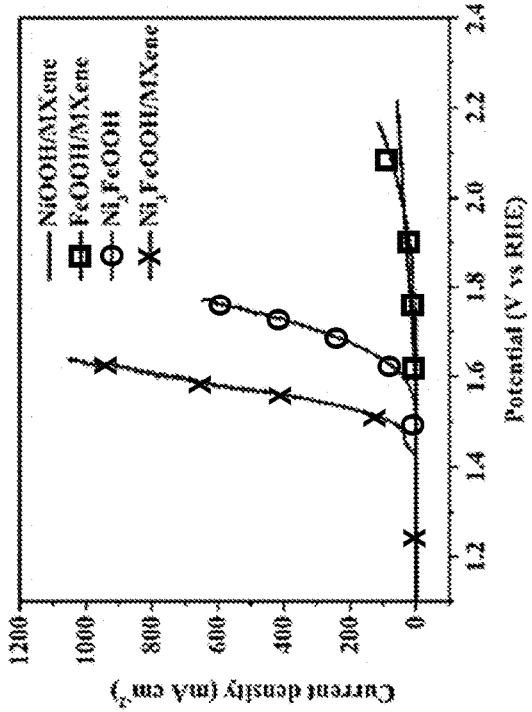
FIG. 4(A) are linear sweep voltammetry (LSV) curves of$Ni_3Fe_1$-LDH/MXene, Ni-LDH/MXene, Fe-LDH/MXene, and $Ni_3Fe_1$-LDH in $O_2$-saturated 1.0 M potassium hydroxide (KOH), according to an embodiment herein.
Figure 6A:
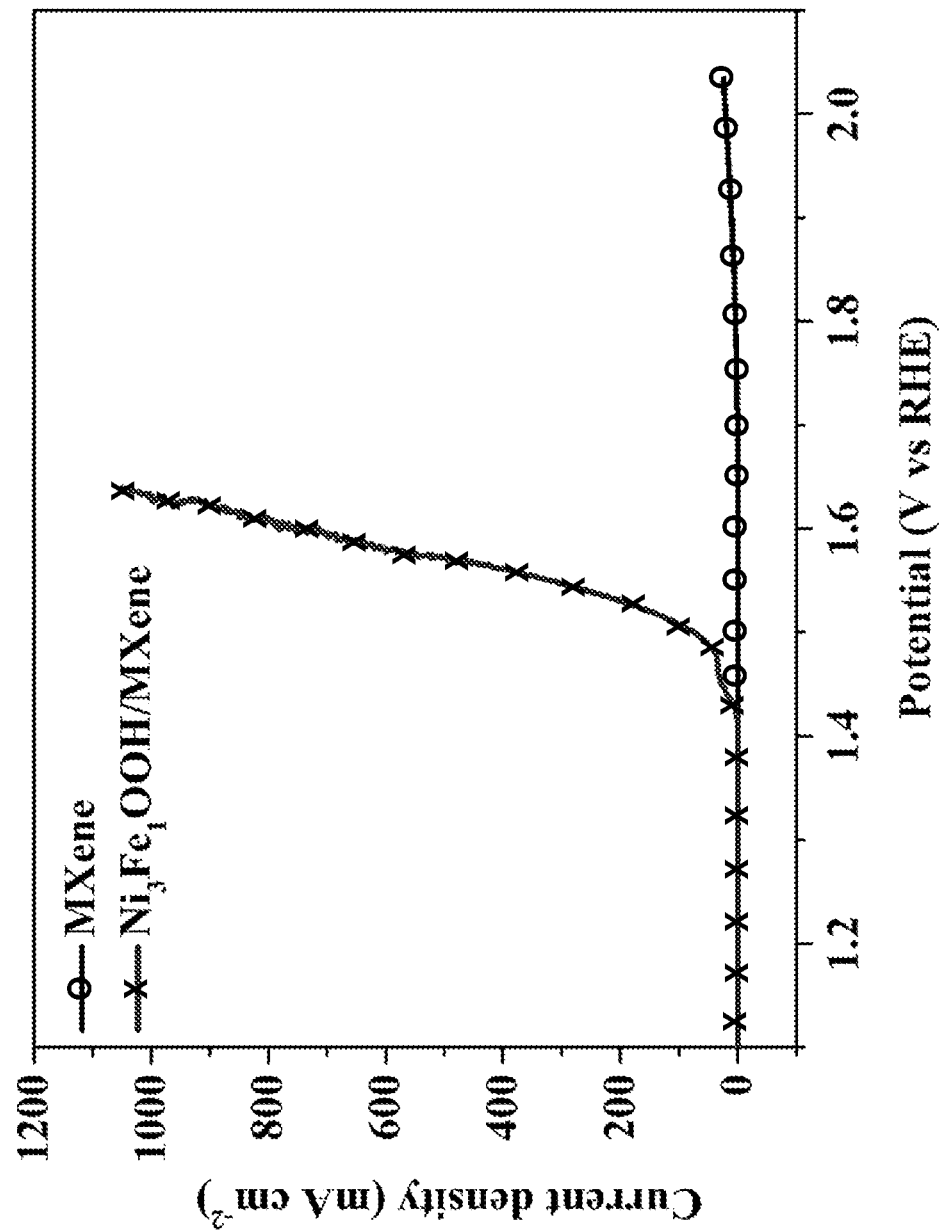
FIG. 6(A) are LSV curves of $Ni_3Fe_1$-LDH/MXene and MXene in $O_2$-saturated 1.0 M KOH, according to an embodiment herein.
Figure 6C:
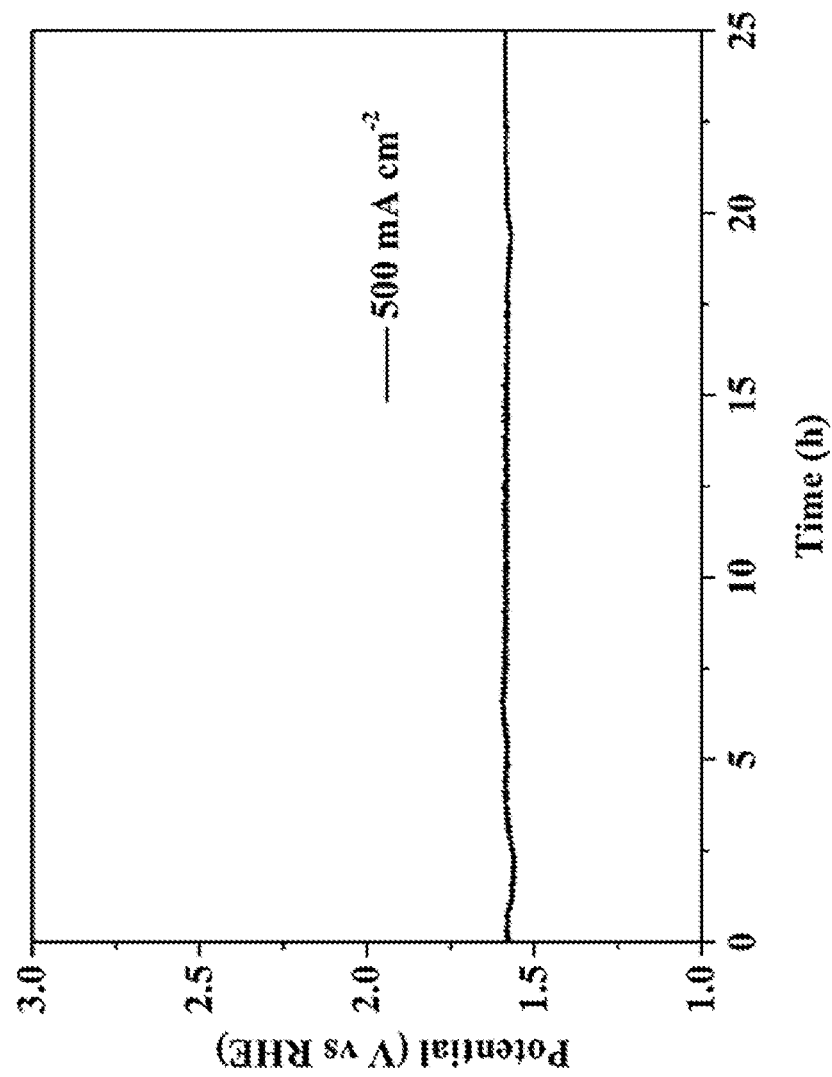
FIG. 6(C) is a chronopotentiometry curve of $Ni_3Fe_1$-LDH/MXene collected at 500 mA cm$^{-2}$ in $O_2$-saturated 1.0 M KOH, according to an embodiment herein.
Figure 6D:
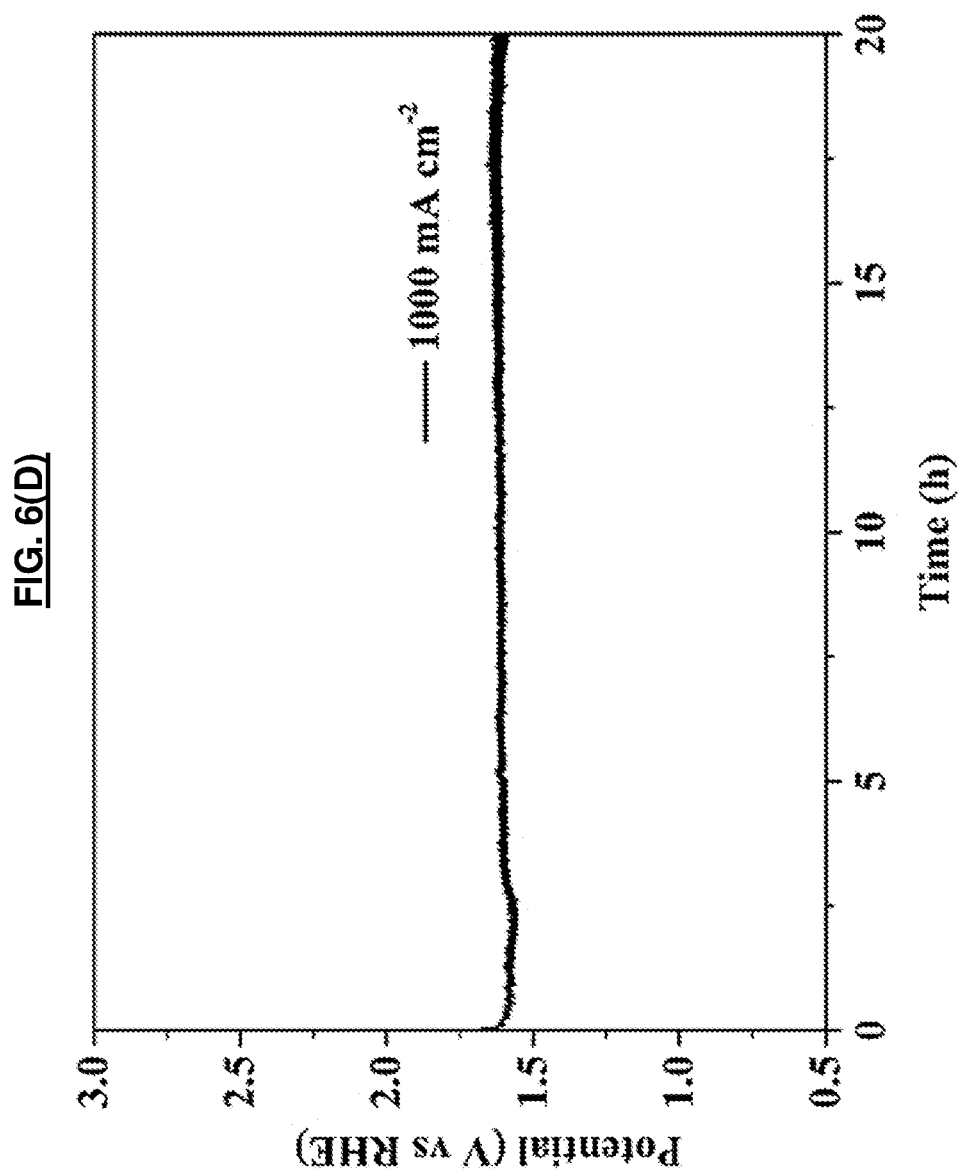
FIG. 6(D) is a chronopotentiometry curve of $Ni_3Fe_1$-LDH/MXene collected at 1000 mA cm$^{-2}$ in $O_2$-saturated 1.0 M KOH without iR correction, according to an embodiment herein.

The OER performance of $Ni_3Fe_1$-LDH/MXene was evaluated by a standard three-electrode setup in $O_2$-saturated 1.0 M KOH solution. For comparison, the Ni-LDH/MXene, Fe-LDH/MXene, pure $Ni_3Fe_1$-LDH and MXene were also synthesized and examined under the same experimental conditions. The iR-corrected LSV curve was carried out with a scan rate of 5 mV $s^{-1}$ to minimize the capacitive current and all potentials used in this work are evaluated vs. reversible hydrogen electrode (RHE). FIG. 4(A) shows iR-corrected LSV curves of $Ni_3Fe_1$-LDH/MXene, Ni-LDH/MXene, Fe-LDH/MXene, and pure $Ni_3Fe_1$-LDH in 1.0 M KOH solution. As shown in FIG. 4(A), the strongest redox peak at around 1.45 V versus RHE was observed in $Ni_3Fe_1$-LDH/MXene due to the redox reaction of $Ni^{2+} \rightarrow Ni^{3+}/Ni^{4+}$, which is considered as the efficient active site for catalyzing the OER in alkaline solution. $Ni_3Fe_1$-LDH/MXene exhibits the best OER performance among all samples. To exclude the anodic current from redox $Ni^{2+}/Ni^{3++}$, the overpotential for producing the current density of 50 mA $cm^{-2}$ ($\eta_{50}$) is used to assess the OER activities of all samples. As shown in FIG. 4(A), to obtain a current density of 50 mA $cm^{-2}$, an overpotential of as low as 0.26 V vs. RHE is required for $Ni_3Fe_1$-LDH/MXene, which is 0.53 and 0.65 V vs. RHE lower than that of Fe-LDH/MXene and Ni-LDH/MXene, respectively. More importantly, the $Ni_3Fe_1$-LDH/MXene created in accordance with the embodiments herein shows a superior OER performance with relative to pure $Ni_3Fe_1$-LDH. For example, the $Ni_3Fe_1$-LDH/MXene provided by the embodiments herein only need overpotentials of 0.26, 0.27 and 0.28 V vs. RHE to deliver 50, 75, and 100 mA $cm^{-2}$, respectively, which is 55, 64, and 74 times higher than those of pure $Ni_3Fe_1$-LDH. Because MXene itself shows a negligible OER property over the entire potential range (as indicated in FIG. 6(A)), suggesting that the MXene support plays in important role in accelerating OER activity of $Ni_3Fe_1$-LDH. Strikingly, the as-prepared $Ni_3Fe_1$-LDH/MXene composite displays an outstanding OER performance at high current density, rarely achieved in previously-reported research. With increasing the current density, the resulting increment of corresponding overpotential for $Ni_3Fe_1$-LDH/MXene is surprisingly small. Even delivering a current density of as high as 1000 mA $cm^{-2}$, the $Ni_3Fe_1$-LDH/MXene provided by the embodiments herein only needs an overpotential of 0.3 V vs. RHE. In contrast, pure $Ni_3Fe_1$-LDH can produce a low current density of 83 mA $cm^{-2}$ at the same potential input. To fairly compare the intrinsic activities, turnover frequency (TOF) of $Ni_3Fe_1$-LDH/MXene, Ni-LDH/MXene, Fe-LDH/MXene, and pure $Ni_3Fe_1$-LDH were calculated. As expected, the as-synthesized $Ni_3Fe_1$-LDH/MXene exhibits the highest TOF of $2.4 \times 10^{-1}$ $s^{-1}$, which is 32, 381, and 387 times higher than that of $Ni_3Fe_1$-LDH ($7.5 \times 10^{-3}$ $s^{-1}$), Ni-LDH/MXene ($6.3 \times 10^{-4}$ $s^{-1}$) and Fe-LDH/MXene ($6.2 \times 10^{-4}$ $s^{-1}$), respectively. The excellent OER performance makes the $Ni_3Fe_1$-LDH/MXene provided by the embodiments herein comparable to most non-precious OER electrocatalyst reported, including FeP/$Ni_2$P, Co(OH)$_2$, FeCoW, $Co_3Se_4$, h-NiSx, $Co_3S_4$/AC, FeCo-LDH, NixB, and Co(OH)$_2$.

Figure 4C:
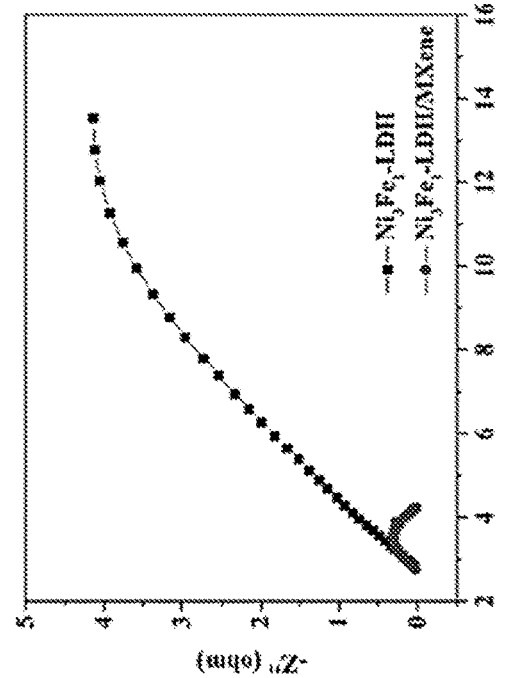
FIG. 4(C) are electrochemical impedance spectroscopy (EIS) spectra for $Ni_3Fe_1$-LDH/MXene and $Ni_3Fe_1$-LDH at 1.558 V vs. RHE, according to an embodiment herein.

To reveal the reaction kinetics of OER for the electrocatalyst, the Tafel slope was obtained from the corresponding LSV curve using the Tafel equation ($\eta = a + b \log j$, $\eta$, j and b represents overpotential, current density, and the Tafel slope, respectively). As shown in FIG. 4(B), the $Ni_3Fe_1$-LDH/MXene catalyst demonstrates the lowest Tafel slope of 18.1 mV $dec^{-1}$ than that of Ni-LDH/MXene (150.5 mV $dec^{-1}$), Fe-LDH/MXene (111.2 mV $dec^{-1}$), and $Ni_3Fe_1$-LDH (59 mV $dec^{-1}$). This value is close to the value (24 mV $dec^{-1}$) suggests the third electron transfer ($MO + OH^- \rightarrow MOOH + e^-$) is the rate determining step, where a hydroxylation reaction involved with OH to form OOH species. EIS was also carried out to understand the superior OER activity of $Ni_3Fe_1$-LDH/MXene. FIG. 4(C) shows the Nyquist plots of $Ni_3Fe_1$-LDH/MXene and $Ni_3Fe_1$-LDH. $Ni_3Fe_1$-LDH/MXene shows a smaller semicircular diameter than that of $Ni_3Fe_1$-LDH, suggesting that a higher charge-transfer rate was achieved on $Ni_3Fe_1$-LDH/MXene. OER possesses low kinetics due to its intrinsic four electron process in alkaline media ($4OH^-+4e\rightarrow 2H_2O+O_2$). Thus, the low resistance will improve charge transfer between electrode/electrolyte and accelerate the intrinsic kinetics for oxygen evolution. Stability of the electrocatalyst is one of the most important parameters to assess the potential of electrode material for commercial applications. The multiple-current chronopotentiometry experiments were performed to examine the rapid response of the carrier migration as revealed in FIG. 6(B).

Attention was only paid to the relative high current densities from 20 to 100 $mA/cm^2$. The response change of applied potentials was consistently demonstrated by stable corresponding current values, confirming an excellent mass transportation property, conductivity, and mechanical robustness of electrode. Furthermore, controlled-current electrolysis at 100 $mA\ cm^{-2}$ was also carried out to evaluate the durability of the catalyst as indicated in FIG. 4(D). The results show that the $Ni_3Fe_1$-LDH/MXene provided by the embodiments herein can stably produce a current density of 100 $mA\ cm^{-2}$ and no apparent degradation was observed after 100 h. More interestingly, the $Ni_3Fe_1$-LDH/MXene catalyst can readily drive water oxidation at high current densities of 500 and 1000 $mA\ cm^{-2}$ at very low potential of 1.57 and 1.62 V, respectively, showing that the catalyst provided by the embodiments herein exhibits outstanding performance over the full range of current densities as further indicated in FIGS. 6(C)-6(D). Overall, these results suggest that the $Ni_3Fe_1$-LDH/MXene catalyst provided by the embodiments herein is very robust for water oxidation applications.

The excellent OER activity and stability of $Ni_3Fe_1$-LDH/MXene under strong alkaline condition prompted further investigation of its OER performance in weak alkaline and neutral electrolytes. In particular, OER in neutral media is more practically useful, for example, allowing direct electrolysis of sea water and being necessary for electrocatalytic $CO_2$ reduction. Therefore, the OER activities of $Ni_3Fe_1$-LDH/MXene in 0.1 M KOH (pH=13) and 1.0 M KPi (pH=7) were evaluated. As expected, similar electrocatalytic activity trends were observed. The $Ni_3Fe_1$-LDH/MXene catalyst provided by the embodiments herein exhibited a superior OER performance compared to pure $Ni_3Fe_1$-LDH in both of 0.1 M KOH and 1.0 M KPi solution as indicated in FIGS. 5(A)-5(B). To achieve a current density of 10 $mA\ cm^{-2}$, $Ni_3Fe_1$-LDH/MXene only needs 1.54 and 1.79 V vs. RHE in 0.1 M KOH and 1.0 M KPi, much lower than those of pure $Ni_3Fe_1$-LDH. Such an enhanced performance is attributed to the MXene can efficiently increase the charge transfer and robustness of $Ni_3Fe_1$-LDH/MXene as further indicated in FIGS. 7(A)-7(D).

The experiment for the Immobilization of NiFe-LDH on MXene for water oxidation at high current density was performed as further described below.

Chemicals

All commercial chemicals were used as received from their respective vendors without any further purification. The chemicals, solutions, and materials used in the experiment were potassium hydroxide (KOH), potassium phosphate monobasic ($KH_2PO_4$), potassium phosphate dibasic ($K_2HPO_4$), N,N-Dimethylformamide (DMF), ethanol ($CH_3CH_2OH$), urea ($NH_2CONH_2$), hydrochloric acid (HCl), nickel nitrate hexahydrate ($Ni(NO_3)_2 \cdot 6H_2O$), iron chloride hexahydrate ($FeCl_3 \cdot 6H_2O$), lithium floride (LiF), carbon paper (HCP020N, CP), and $Ti_3AlC_2$ (MAX) powders. Moreover, deionized water deionized (18 MΩ·cm) was used in all experiments.

Characterization

X-ray diffraction (XRD) patterns were obtained on a Rigaku® MinifexII Desktop X-ray diffractometer in Bragg Brentano geometry with monochromatic Cu Kα radiation (0.1541 nm) at a step size of 0.02°. The tube source was performed at 30 kV and 15 mA. The scan rate is 1° $min^{-1}$. The powder was affixed on a stainless steel sample bar.

Syntheses of Electrocatalysts-Syntheses of MXene

Multilayer $Ti_3C_2$ was produced by etching $Ti_3AlC_2$ MAX phase in a mixture of HCl and LiF. Specifically, 0.8 g of LiF was added to 7.5 mL of 9 M HCl and 2.5 mL of DI $H_2O$ solution, followed by a slow addition of 0.5 g of $Ti_3AlC_2$ with stirring in an ice bath. After etching at 35° C. for 24 h, the multilayer $Ti_3C_2$ was washed with deionized water for 7 times and was collected and dried under vacuum.

Syntheses of Electrocatalysts-Syntheses of NiFe-LDH/MXene 10 mg of MXene was ultrasonically dispersed in 4.5 mL of DMF for 2 h. Then, the $Ni(NO_3)_2 \cdot 6H_2O$ (0.152 g), $Fe(NO_3)_3 \cdot 9H_2O$ (0.047 g) and urea (1.72 g) was dissolved in 2.8 mL of deionized water and 2.8 mL of DMF to form a homogenous solution. The above two solutions were mixed under stirring for 2 h and was transferred into a 25 mL Teflon®-lined stainless steel autoclave for solvothermal reaction at 120° C. for 12 h. After the mixture was cooled to room temperature, the products were collected by centrifugation, washed three times with deionized water and ethanol, and eventually dried in an oven at 60° C. for 10 h. In addition to the NiFe LDH, CoFe LDH was also experimentally produced using the process for NiFe but with substitution with 0.152 g $Co(NO_3)_2$ $6H_2O$ to replace 0.152 g $Ni(NO_3)_2 \cdot 6H_2O$. This resulted in CoFe/MXene with an OER activity similar to NiFe/MXene.

Electrochemical Measurement

The nonprecious catalysts were prepared by ultrasonically mixing 4 mg of the catalyst powder with the mixture of 1160 μL of ethanol, 800 μL of $H_2O$, and 40 μL of a 5% Nafion solution for 1 h to form homogeneous catalyst inks. The density is 6 mg/mL. Next, 100 μL of the catalyst ink was carefully dropped onto a carbon paper (CP. 0.25 $cm^2$).

All electrochemical experiments were conducted using a Gamry Interface 1000™ electrochemical workstation with a three-electrode configuration. The current densities were calculated on the basis of the geometric area of each working electrode. The $Ni_3Fe_1$-LDH/MXene supported on CP with loading of 2.88 $mg/cm^2$ was directly used as the working electrode. A calibrated Hg/HgCl (saturated KCl) with a salt bridge kit and a carbon rod were used as the counter and reference electrode, respectively. The electrolyte was 1.0 M KOH (13.85), 0.1 M KOH (12.85) or 1.0 KPi (7.17) solution. All electrolytes were bubbled with $O_2$ throughout the whole electrochemical experiments. All potentials are reported versus reversible hydrogen electrode (RHE) according to the following equation:

$$E(vs.RHE)=E(vs.Hg/HgCl)+0.241+0.059\times pH \quad (1)$$

Linear Sweep Voltammetry (LSV)

The polarization curves were recorded by LSV. The scan rate was 5 mV/s. Unless stated otherwise, all LSV curves for OER were iR-corrected and obtained by scanning from negative to positive potential. The correction was made according to the following equation:

$$E_{corrected}=E_{measured}-iR_s \quad (2)$$

where $E_{corrected}$ is the iR-corrected potential, $E_{measured}$ and i are experimentally measured potential and current, respectively, and $R_s$ is the equivalent series resistance measured via EIS.

Electrochemical Impedance Spectroscopy (EIS)

Figure 6E:
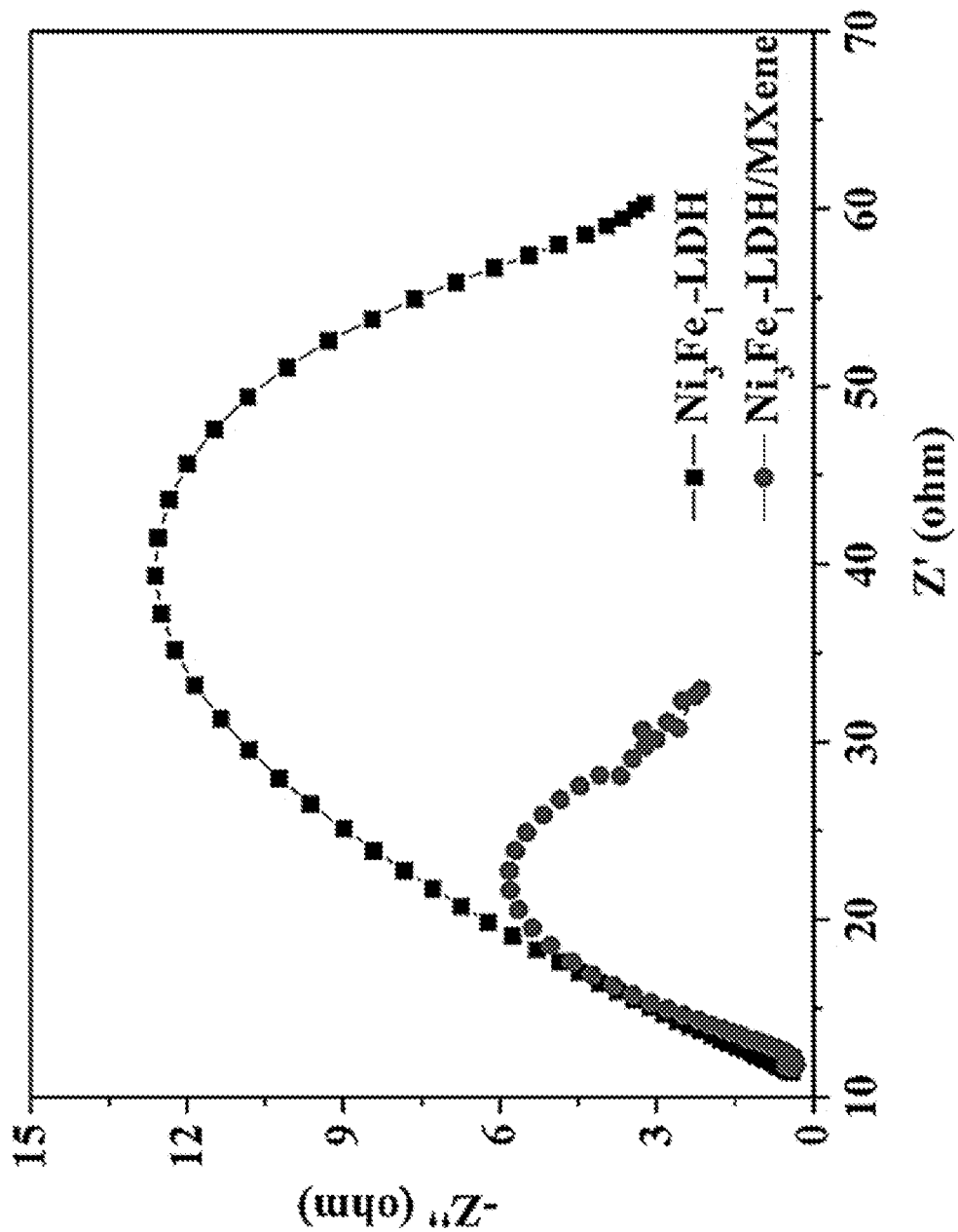
FIG. 6(E) are EIS spectra for $Ni_3Fe_1$-LDH/MXene and $Ni_3Fe_1$-LDH at 1.558 V vs. RHE in 0.1 M KOH solution, according to an embodiment herein.
Figure 6F:
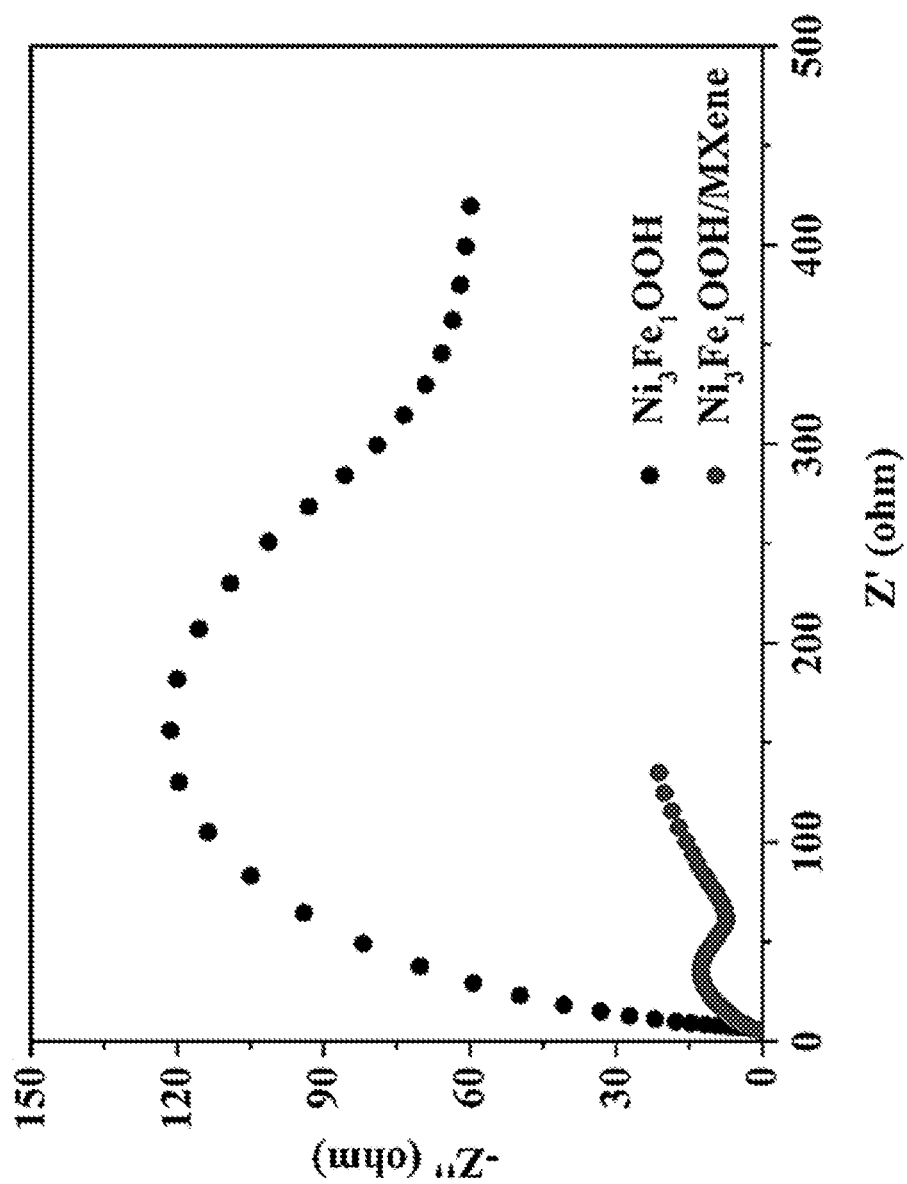
FIG. 6(F) are EIS spectra for $Ni_3Fe_1$-LDH/MXene and $Ni_3Fe_1$-LDH at 1.558 V vs. RHE in 1.0 M KPi solution, according to an embodiment herein.
Figure 6G:
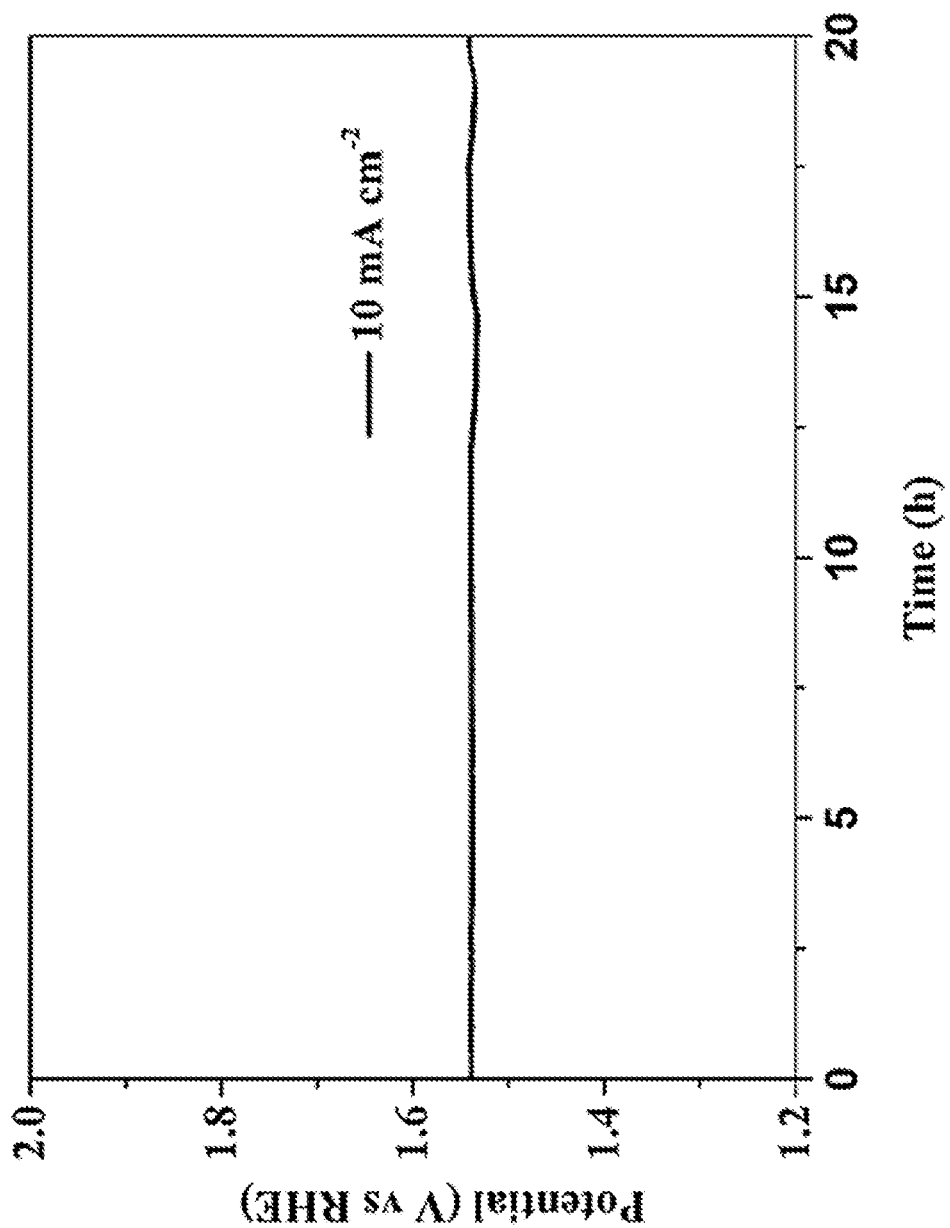
FIG. 6(G) is a chronopotentiometry curve of $Ni_3Fe_1$-LDH/MXene collected at 10 mA cm$^{-2}$ in $O_2$-saturated 0.1 M KOH, according to an embodiment herein.
Figure 7A:
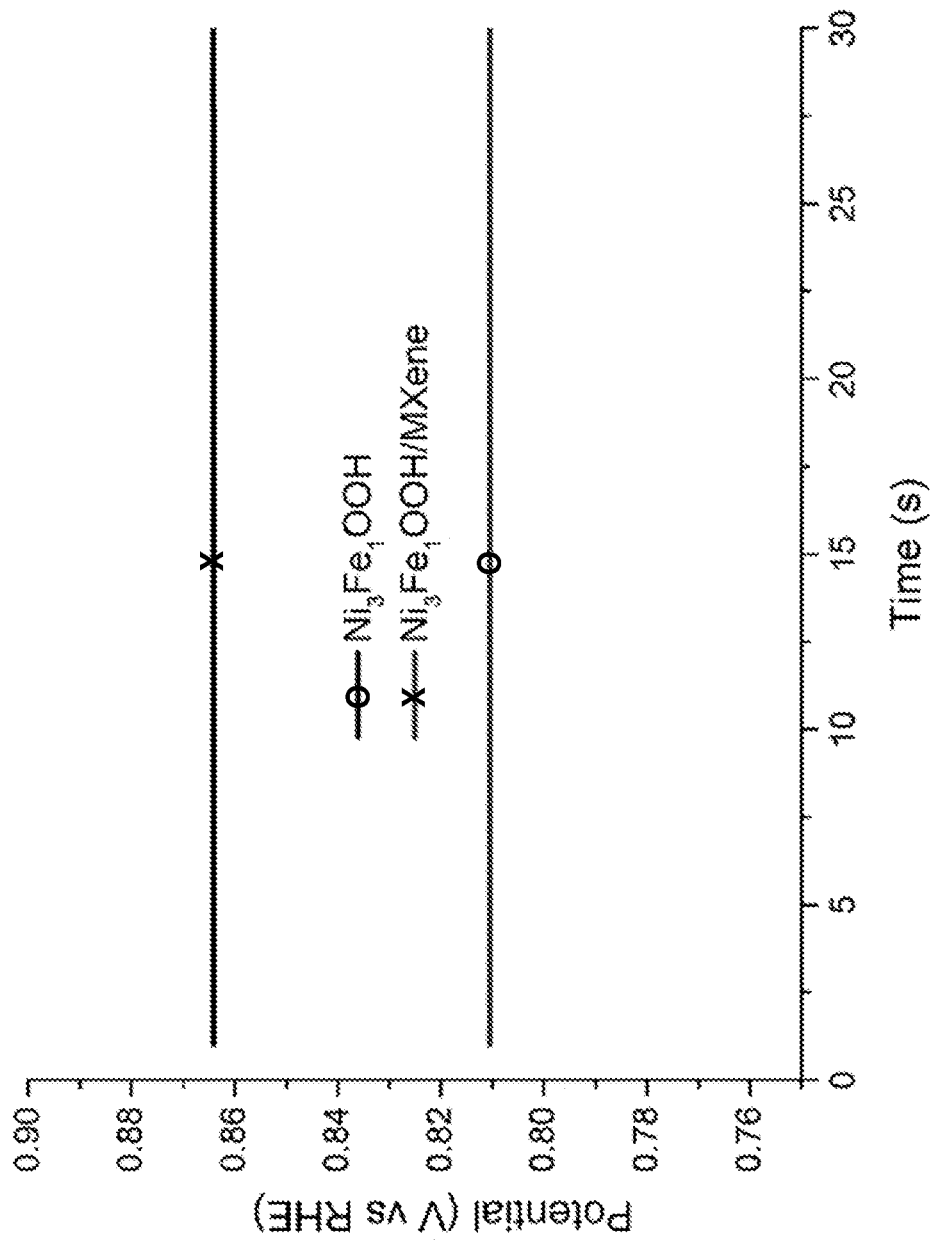
FIG. 7(A) are open circuit potential (OCP) curves of $Ni_3Fe_1$-LDH/MXene and $Ni_3Fe_1$-LDH, according to an embodiment herein.
Figure 7B:
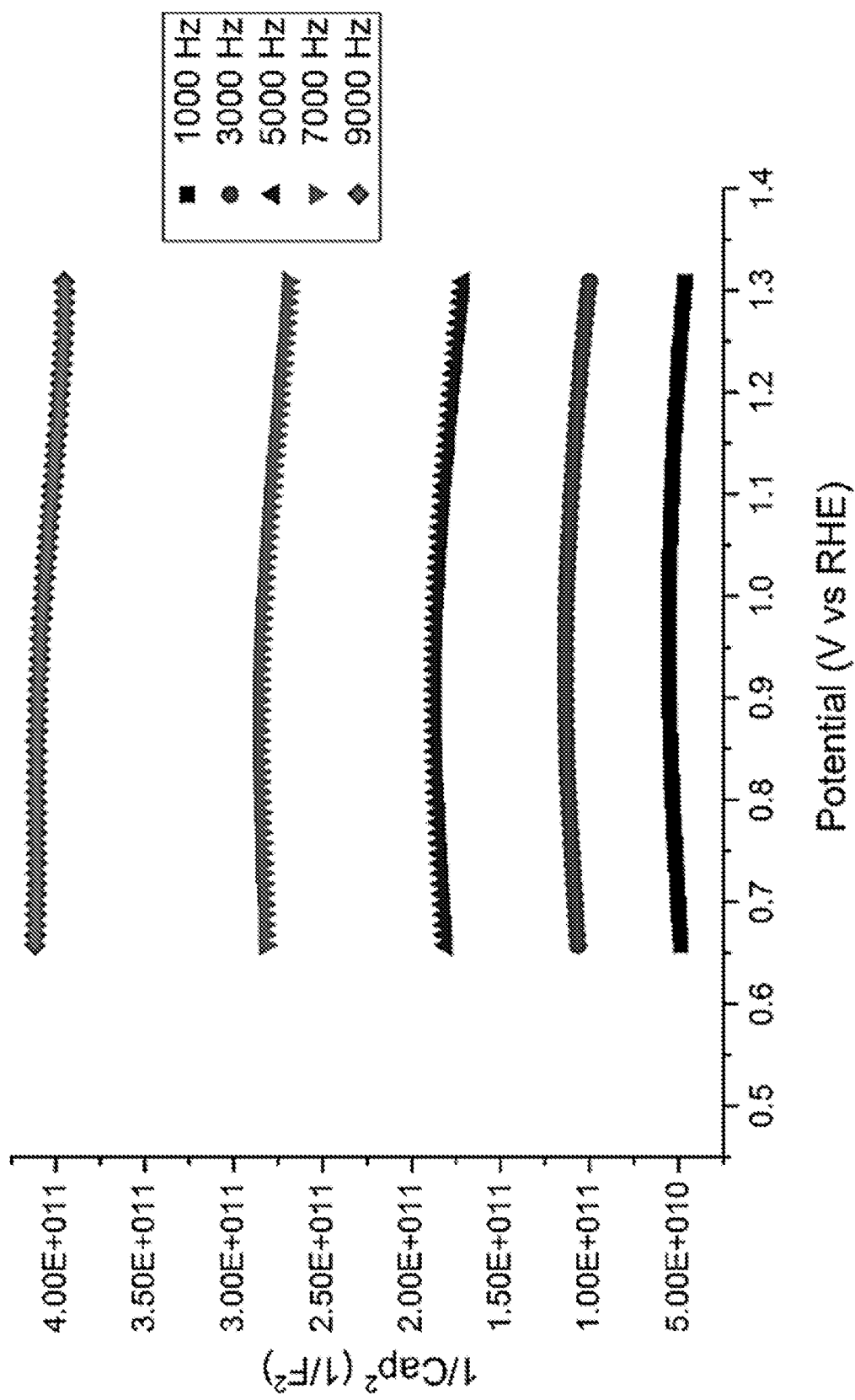
FIG. 7(B) are Mott curves of $Ni_3Fe_1$-LDH/MXene at different frequencies, according to an embodiment herein.
Figure 7C:
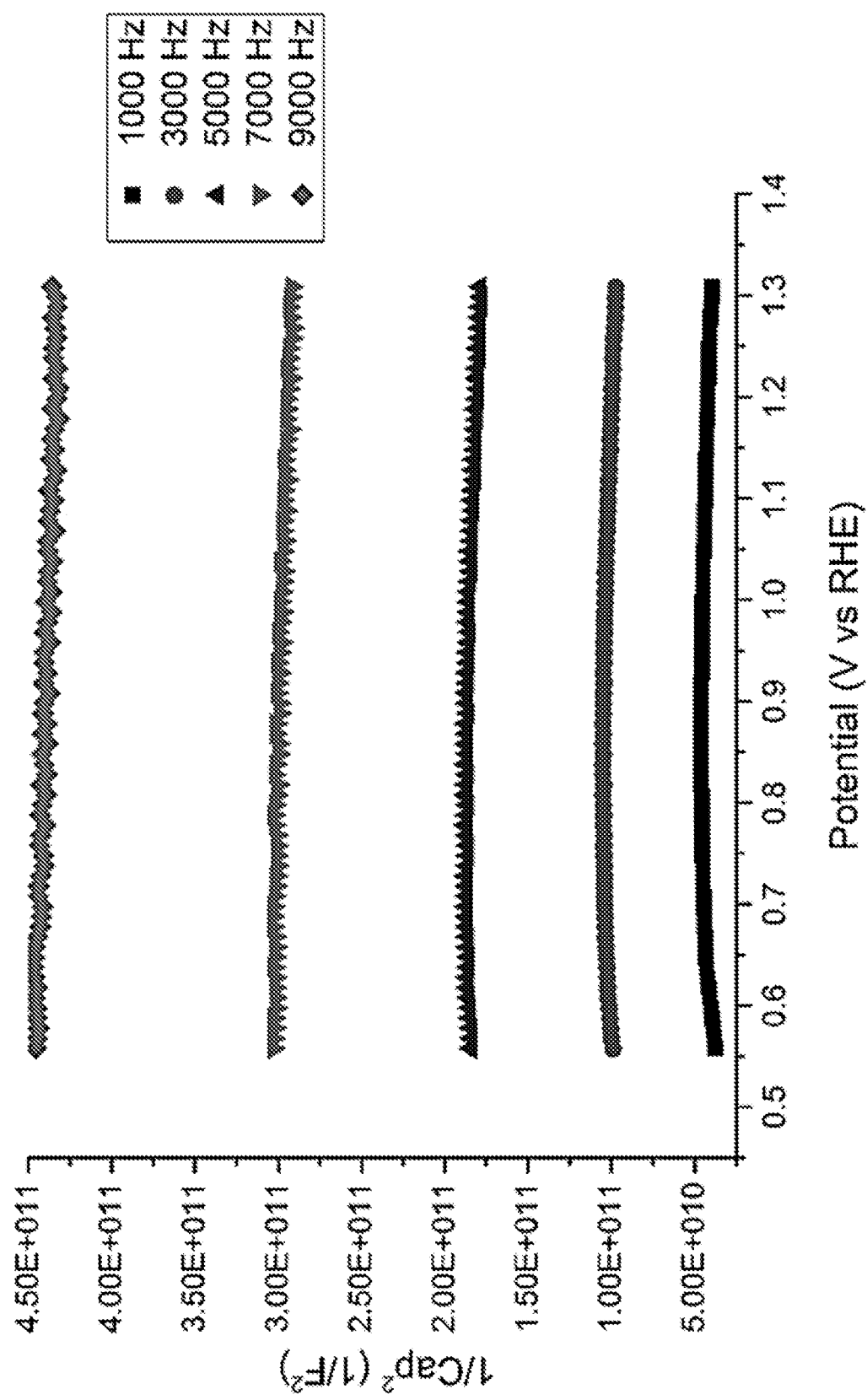
FIG. 7(C) are Mott curves of $Ni_3Fe_1$-LDH at different frequencies, according to an embodiment herein.
Figure 7D:
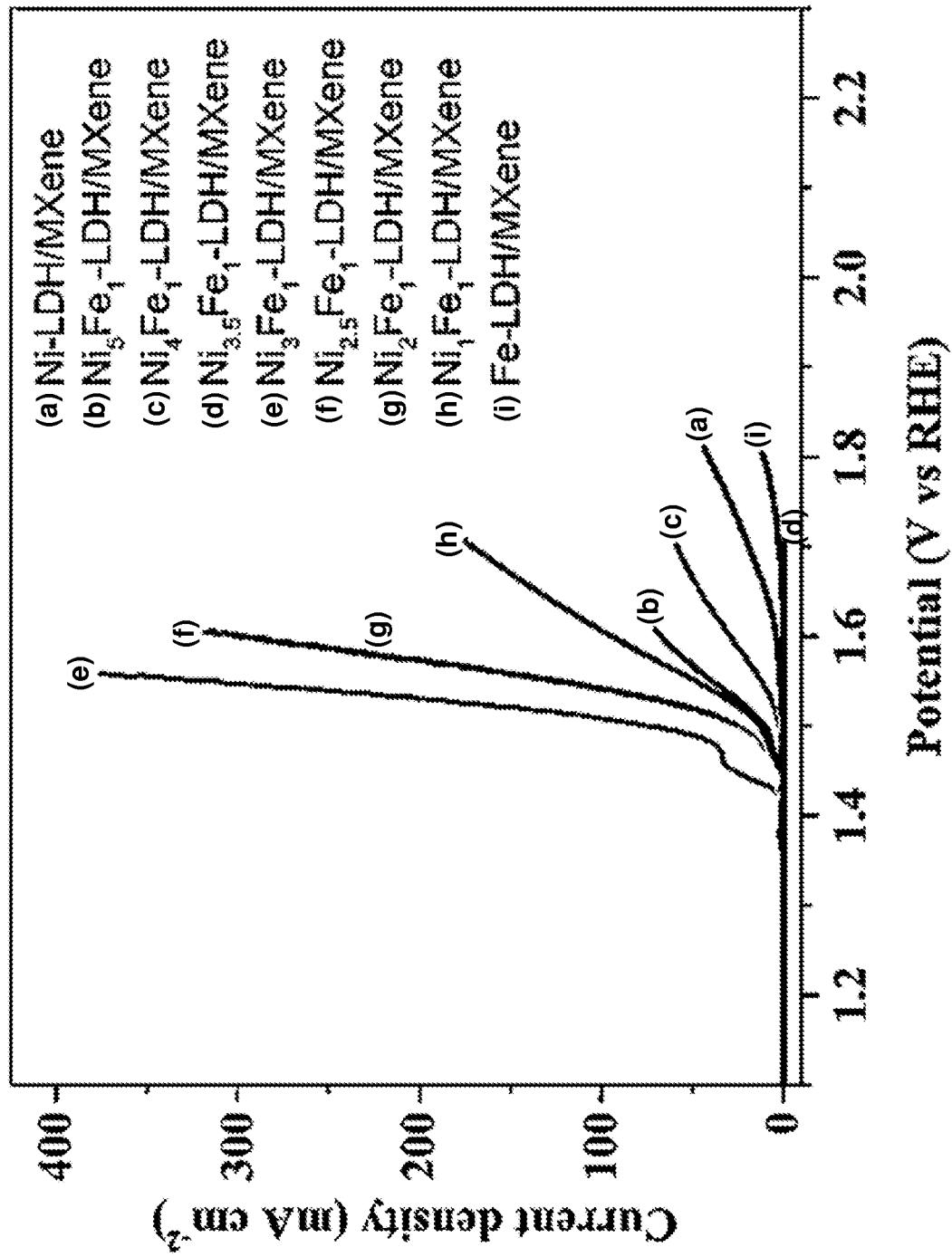
FIG. 7(D) are LSV curves of NixFe1-x-LDH/MXene ($0 \leq x \leq 1$) in $O_2$-saturated 1.0 M KOH, according to an embodiment herein.

EIS measurements in 1.0 M KOH were carried out at 1.558 V vs. RHE in the frequency range of $10^6$-0.01 Hz with the results shown in FIG. 6(E). EIS measurements in 1.0 M KPi were carried out at 1.558 V vs. RHE in the frequency range of $10^6$-0.01 Hz with the results shown in FIG. 6(F).

Chronopotentiometry (CP)

The catalytic stability for OER was evaluated by CP measurement with iR correction. The CP test was measured at a current density of 100, 500, and 1000 mA/cm$^2$ in 1.0 M KOH solution to evaluate the stability of electrocatalysts with the results shown in FIG. 6(G).

Turnover Frequency (TOF)

The turnover frequency was calculated according to equation (3):

$$TOF=(J \times A)/(4 \times F \times n) \quad (3)$$

where J is the current density at a given overpotential of 350 mV, A is the surface area of the electrode, the number 4 represents 4 electrons/mol of $O_2$, F is the Faraday constant (96485 C mol$^{-1}$), and n stands for the number of moles of metal ions (Ni+Fe) in $Ni_3Fe_1$-LDH/MXene.

Figure 8:
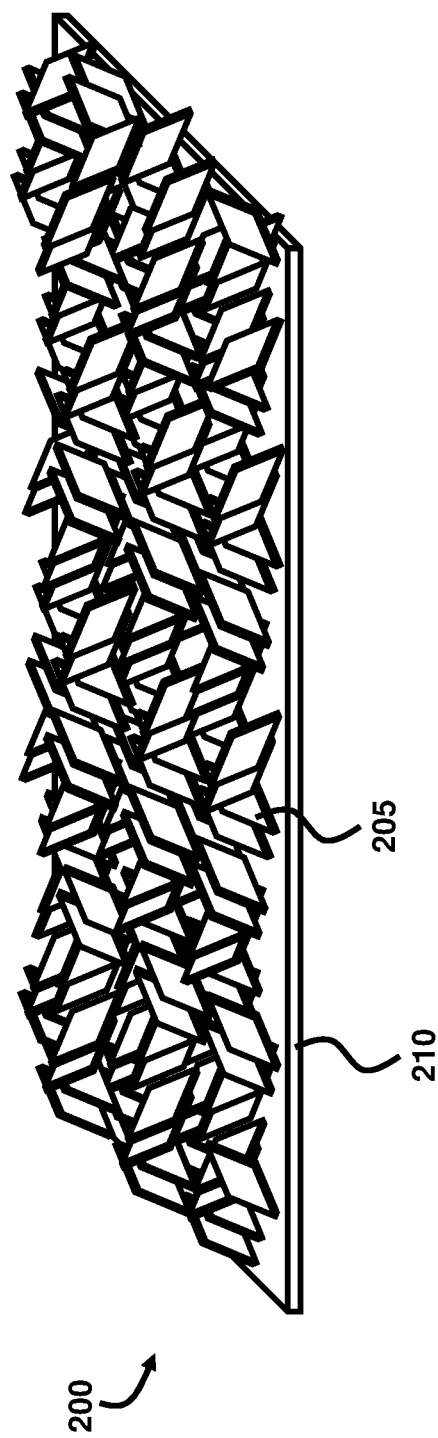
FIG. 8 is a schematic diagram of an electrocatalyst for an oxygen evolution reaction, according to an embodiment herein.

FIG. 8 is a schematic diagram of an electrocatalyst 200 for an oxygen evolution reaction formed by growing and immobilizing an earth-abundant metal and layered double hydroxide 205 on a MXene two-dimensional (2D) substrate 210 using a solvothermal, hydrothermal, or electrodeposition process and in accordance with the method 100 described above. The electrocatalyst 200 may produce a current density of 500-1000 mA/cm$^2$ for at least 20 hours without degradation thereof. In some examples, the earth-abundant metal may comprise any of NiFeOOH, Mn, Fe, Co, Ni, Cu, Ti, V, Cr, and a combination thereof. In an example, the earth-abundant metal may be nanoparticles. According to an example, the nanoparticles may include multiple metals. The MXene 2D substrate 210 may comprise Ti sites that are used as donors to stabilize the earth-abundant metal and layered double hydroxide 205 to alter electrocatalytic oxygen evolution reactions of the electrocatalyst 200. The MXene 2D substrate may comprise a composition according to the formula Mn+1 XnTx, where M is an early transition metal, X is C and/or N, T represents functional groups comprising one or more of the group consisting of —OH, —O, —Cl, and —F, n is an integer with n≥1, and x is an integer with x≥1. The MXene 2D substrate may comprise MXene in the form of sheets having surfaces functionalized with functional groups comprising one or more of the group consisting of —OH, —O, —Cl, and —F.

The embodiments herein provide a unique technique to immobilize NiFe-LDH on MXene, which constructs well-defined hierarchical 2D sandwich structures for electrocatalytic water oxidation. According to an example, MXene ($Ti_3C_2$) serves as a 2D substrate not only to enhance conductivity of the electrocatalyst, but also enable vertically growing NiFe-LDH on the MXene surface to supply more catalytic sites for subsequent water oxidation. In addition, the Ti sites on MXene can be used as donors to stabilize $Ni^{3+}$ in NiFe-LDH, thereby improving the OER properties. As a result, the obtained NiFe-LDH/MXene catalyst show excellent catalytic activity, fast kinetics and good stability towards water oxidation in alkaline medium. Furthermore, the NiFe-LDH/MXene material provided by the embodiments herein provide a large current density (500 to 1000 mA/cm$^2$) at low overpotential input for at least 20 hours, which highlights the great promising application of MXene-based nanohybrids in energy conversion and storage.

According to some examples, oxidized surfaces, oxo, or halogen functionality present on the metal surfaces (e.g., Ni, Fe, Ti, etc.) may act to increase or decrease reaction performance, overpotential, stability and/or kinetics. In some examples, these groups may be added or formed during use. Moreover, the catalyst composite remains a catalyst regardless of these groups.

In other examples, metal or halogen dopants or contaminants (e.g., Li, Cl, etc.) within the Ni and/or Fe guest particles, along grain boundaries or lattice (e.g., including in the voids, defects, or interstitial regions); and/or on the surface of the Ni and/or Fe guest particles may act to increase or decrease reaction performance, overpotential, stability and/or kinetics. In some examples, these dopants or contaminants may be added or be present as contaminants from a production process. Furthermore, the catalyst composite remains a catalyst regardless of these dopants or contaminants.

In other examples, changing surface roughness or porosity of the Ni and/or Fe guest particles may act to increase or decrease reaction performance, overpotential, stability and/or kinetics through processes such as increased surface area or exposure of other crystalline lattice faces. Surface roughness may be modified using reaction processes known in the art and/or dissolution of the respective metal. Additionally, the catalyst composite remains a catalyst regardless of the surface roughness or porosity.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A method of preparing an electrocatalyst for oxygen evolution reactions, the method comprising:
    synthesizing MXene by etching a $Ti_3AlC_2$ MAX phase in a mixture of HCl and LiF, adding $Ti_3AlC_2$ while stirring in an ice bath, and etching at 35° C. for 24 hours to produce $Ti_3C_2$, washing the $Ti_3C_2$, and drying the $Ti_3C_2$ under vacuum;
    synthesizing an earth-abundant metal and a layered double hydroxide (LDH), wherein the earth-abundant metal is selected from the group consisting of nanoparticles of Fe, Co, and a combination thereof, the synthesizing the earth-abundant metal and the LDH comprising dissolving $Co(NO_3)_2 \cdot 6H_2O$, $Fe(NO_3)_3 \cdot 9H_2O$, and urea in deionized water and dimethylformamide to form a second solution;
    mixing the MXene and the earth-abundant metal and the layered double hydroxide to form a combined solution;
    performing a solvothermal, hydrothermal, or electrodeposition process on the combined solution, the solvothermal or hydrothermal processes being performed at 120° C. for 12 hours;

centrifuging the combined solution to separate solids from liquids in the combined solution; and drying the solids to form an electrocatalyst powder.

2. The method of claim 1, further comprising ultrasonically dispersing the synthesized MXene in dimethylformamide to form a first solution.

3. The method of claim 2, wherein the mixing the MXene and the earth-abundant metal and the layered double hydroxide to form the combined solution comprises mixing the first solution with the second solution to form the combined solution.

4. The method of claim 1, further comprising adding metal or halogen dopants or contaminants in the earth-abundant metal.

5. The method of claim 1, further comprising altering a surface roughness or porosity of the earth-abundant metal.

6. The method of claim 1, comprising vertically or horizontally growing the earth-abundant metal and the layered double hydroxide on the MXene.

7. The method of claim 1, further comprising performing one or more or a combination of:

growing in multiple dimensions the earth-abundant metal and the layered double hydroxide on the MXene;

growing interconnected structures or networks of the earth-abundant metal and the layered double hydroxide on the MXene; and growing discrete structures of the earth-abundant metal and the layered double hydroxide on the MXene to form $CoFe-LDH/Ti_3C_2T_x$.

\* \* \* \* \*